US012772256B2

(12) United States Patent
Sun et al.

(10) Patent No.: US 12,772,256 B2
(45) Date of Patent: Oct. 20, 2026

(54) SIMPLIFIED DESIGN FOR FIXED SIZE CODEBOOKS

(71) Applicant: QUALCOMM Incorporated, San Diego, CA (US)

(72) Inventors: Jing Sun, San Diego, CA (US); Mostafa Khoshnevisan, San Diego, CA (US); Yi Huang, San Diego, CA (US); Jing Jiang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 323 days.

(21) Appl. No.: 18/437,174

(22) Filed: Feb. 8, 2024

(65) Prior Publication Data

US 2025/0261213 A1 Aug. 14, 2025

(51) Int. Cl.
*H04W 72/232* (2023.01)
*H04L 1/1607* (2023.01)
*H04W 72/1273* (2023.01)

(52) U.S. Cl.
CPC ......... *H04W 72/232* (2023.01); *H04L 1/1607* (2013.01); *H04W 72/1273* (2013.01)

(58) Field of Classification Search
CPC ............ H04W 72/232; H04W 72/1273; H04L 1/1607; H04L 1/1685; H04L 1/1854; H04L 1/1861; H04L 1/1896
See application file for complete search history.

(56) References Cited

U.S. PATENT DOCUMENTS

| | | | | |
|---|---|---|---|---|
| 2012/0099491 A1* | 4/2012 | Lee | H04L 1/0015 370/280 |
| 2020/0092068 A1* | 3/2020 | Yang | H04W 52/06 |
| 2021/0321438 A1* | 10/2021 | Khoshnevisan | H04L 1/1614 |
| 2022/0278774 A1* | 9/2022 | Zhu | H04L 1/1812 |

(Continued)

FOREIGN PATENT DOCUMENTS

WO WO-2022094562 A2 5/2022

OTHER PUBLICATIONS

International Search Report and Written Opinion—PCT/US2025/010804—ISA/EPO—Apr. 14, 2025 (2309395WO).

(Continued)

*Primary Examiner* — Shawn D Miller
(74) *Attorney, Agent, or Firm* — Holland & Hart LLP

(57) ABSTRACT

Methods, systems, and devices for wireless communication are described. A Type-I codebook, such as a semi-static fixed size codebook, may be designed to be used for reporting feedback for messages scheduled by a single downlink control information (DCI) message in communications where feedback multiplexing may be avoided. Additionally, or alternatively, a network entity and a user equipment (UE) implementing a Type-I codebook may consider overlapping feedback resources for different DCI messages as an error case. By way of another example, a network entity may allow overlap in scheduling, and a UE may bundle feedback into a single bit. A Type-I codebook payload size may be based on a quantity of code-block groups (CBGs) or a quantity of codewords in a transport block (TB), and may be used for fallback DCI messages. Further, puncturing or rate matching operations may be performed when provision of resources overlap with uplink transmissions.

28 Claims, 16 Drawing Sheets

(56) References Cited

U.S. PATENT DOCUMENTS

| | | | |
|---|---|---|---|
| 2023/0022440 A1 | 1/2023 | Yang et al. | |
| 2023/0072973 A1* | 3/2023 | Lee | H04L 1/1812 |
| 2023/0139269 A1 | 5/2023 | Molavianjazi et al. | |
| 2023/0389017 A1 | 11/2023 | Khoshnevisan et al. | |
| 2024/0414698 A1* | 12/2024 | Su | H04L 5/0023 |

OTHER PUBLICATIONS

Moderator (Lenovo): "Feature Lead Summary #4 on Multi-Cell PUSCH/PDSCH Scheduling With a Single DCI", 3GPP TSG RAN WG1 Meeting #112, R1-2301094, Type Discussion; NR_MC_ENH-Core, 3rd Generation Partnership Project, Mobile Competence Centre, 650, Route Des Lucioles, F-06921, Sophia-Antipolis Cedex, France, vol. RAN WG1, No. Athens, GR; Feb. 27, 2023-Mar. 3, 2023, Mar. 3, 2023, 102 Pages, XP052251696, p. 72-p. 96.

Samsung: "Remaining Issues on Multi-Cell PUSCH/PDSCH Scheduling With a Single DCI", 3GPP TSG RAN WG1 #115, R1-2311860, Type Discussion; NR_MC_ENH-Core, 3rd Generation Partnership Project, Mobile Competence Centre, 650, Route Des Lucioles, F-06921, Sophia-Antipolis Cedex, France, vol. RAN WG1, No. Chicago, US; Nov. 13, 2023-Nov. 17, 202311, Nov. 3, 2023, 17 Pages, XP052545510, p. 7-p. 9.

* cited by examiner

SIMPLIFIED DESIGN FOR FIXED SIZE CODEBOOKS

INTRODUCTION

The following relates to wireless communications that pertain to simplified design for fixed size codebooks. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support simplified design for fixed size codebooks. For example, the described techniques provide for implementing a simplified fixed size codebook design (e.g., hybrid automatic repeat request (HARQ) codebook design) with a limited functionality. For example, a Type-I codebook (e.g., a fixed size codebook, a semi-static codebook) may be designed to be used for reporting feedback for messages scheduled by a single downlink control information (DCI) message in communications where feedback multiplexing may be avoided (e.g., sparse or low coverage scenarios). As a result, a robustness in communications may be improved through more frequent use of fixed size codebooks. Further, communication latency and resource usage in a network may be improved as one or more downlink assignment indicators (DAIs) used for Type-II codebooks may be omitted from one or more DCI messages when using simplified Type-I codebooks. Additionally, or alternatively, a network entity (e.g., a base station) and a user equipment (UE) implementing a Type-I codebook may consider overlapping feedback resources for different DCI messages as an error case. Further, a network entity may allow overlap in scheduling, and a UE may bundle feedback into a single bit. In some cases, a Type-I codebook size may be based on a quantity of code-block groups (CBGs) or a quantity of codewords in a transport block (TB), and may be used for fallback DCI messages. Further, puncturing or rate matching operations may be performed when provision (e.g., usage of scheduled resources) of a DCI message overlaps with provision of one or more uplink message transmissions.

A method for wireless communication by a network entity is described. The method may include receiving a first downlink control information (DCI) message that schedules a first downlink shared channel message and requests that the network entity provide first feedback with respect to the first downlink shared channel message, determining a codebook based on reception of the first downlink shared channel message, where the codebook is defined to provide feedback associated with a single DCI message, and transmitting a feedback indication that is associated with the first feedback.

A network entity for wireless communication is described. The network entity may include one or more memories storing processor executable code, and one or more processors coupled with the one or more memories. The one or more processors may individually or collectively be operable to execute the code to cause the network entity to receive a first DCI message that schedules a first downlink shared channel message and requests that the network entity provide first feedback with respect to the first downlink shared channel message, determine a codebook based on reception of the first downlink shared channel message, where the codebook is defined to provide feedback associated with a single DCI message, and transmit a feedback indication that is associated with the first feedback.

Another network entity for wireless communication is described. The network entity may include means for receiving a first DCI message that schedules a first downlink shared channel message and requests that the network entity provide first feedback with respect to the first downlink shared channel message, means for determining a codebook based on reception of the first downlink shared channel message, where the codebook is defined to provide feedback associated with a single DCI message, and means for transmitting a feedback indication that is associated with the first feedback.

A non-transitory computer-readable medium storing code for wireless communication is described. The code may include instructions executable by one or more processors to receive a first DCI message that schedules a first downlink shared channel message and requests that the network entity provide first feedback with respect to the first downlink shared channel message, determine a codebook based on reception of the first downlink shared channel message, where the codebook is defined to provide feedback associated with a single DCI message, and transmit a feedback indication that is associated with the first feedback.

Some examples of the method, network entities, and non-transitory computer-readable medium described herein may further include operations, features, means, or instructions for receiving a second DCI message that schedules a second downlink shared channel message and requests that the network entity provide second feedback with respect to the second downlink shared channel message, where provision of the second feedback may be scheduled by the second DCI message to overlap with provision of the first feedback, where the overlap may be associated with an error condition based on the codebook being defined to provide feedback for a single DCI message; and where determining the codebook includes and populating the codebook with the first feedback.

Some examples of the method, network entities, and non-transitory computer-readable medium described herein may further include operations, features, means, or instructions for receiving a second DCI message that schedules a second downlink shared channel message and requests that the network entity provide second feedback with respect to the second downlink shared channel message, where provision of the second feedback may be scheduled by the second DCI message to overlap with provision of the first feedback; and where determining the codebook includes and populating the codebook with bundled feedback that may be based on the first feedback associated with the first DCI message and on the second feedback associated with the second DCI message, where inclusion of the bundled feedback in the codebook that may be defined to provide feedback associated with a single DCI message may be an exception based on the overlap.

In some examples of the method, network entities, and non-transitory computer-readable medium described herein, determining the codebook may include operations, features, means, or instructions for including the first feedback in the codebook on a per-CBG basis when CBG feedback may be enabled, where a payload size of the codebook may be based on a quantity of CBGs associated with the first downlink shared channel message.

In some examples of the method, network entities, and non-transitory computer-readable medium described herein, the payload size of the codebook may be equal to the quantity of CBGs associated with the first downlink shared channel message.

In some examples of the method, network entities, and non-transitory computer-readable medium described herein, determining the codebook may include operations, features, means, or instructions for including the first feedback in the codebook on a per-codeword basis, where a payload size of the codebook may be based on a quantity of codewords associated with the first downlink shared channel message.

In some examples of the method, network entities, and non-transitory computer-readable medium described herein, the payload size of the codebook may be equal to the quantity of codewords associated with the first downlink shared channel message.

In some examples of the method, network entities, and non-transitory computer-readable medium described herein, transmitting the feedback indication associated with the first feedback may include operations, features, means, or instructions for puncturing a scheduled uplink shared channel message with transmission of the feedback indication based on an overlap between the scheduled uplink shared channel message and provision of the first feedback.

In some examples of the method, network entities, and non-transitory computer-readable medium described herein, the scheduled uplink shared channel message may be punctured by transmission of the feedback indication when a payload size of the codebook satisfies a threshold payload size.

In some examples of the method, network entities, and non-transitory computer-readable medium described herein, transmitting the feedback indication associated with the first feedback may include operations, features, means, or instructions for rate matching a scheduled uplink shared channel message with transmission of the feedback indication based on an overlap between the scheduled uplink shared channel message and provision of the first feedback when a payload size of the codebook satisfies a threshold payload size.

In some examples of the method, network entities, and non-transitory computer-readable medium described herein, the network entity may be configured to use the codebook as a fallback codebook when multiple different codebooks may be configured and provision of respective feedback for each of the multiple different codebooks may be scheduled to overlap.

In some examples of the method, network entities, and non-transitory computer-readable medium described herein, transmission of the feedback indication may be in accordance with the codebook and may be based on the fallback codebook being prioritized over non-fallback codebooks.

In some examples of the method, network entities, and non-transitory computer-readable medium described herein, transmission of the feedback indication may be in accordance with a second codebook different from the codebook and the feedback indication includes the first feedback multiplexed with second feedback associated with the second codebook.

A method for wireless communication by a first network entity is described. The method may include transmitting a first DCI message that schedules a first downlink shared channel message and requests that a second network entity provide first feedback with respect to the first downlink shared channel message and receiving, via a codebook and based on transmission of the first DCI message, a feedback indication that is associated with the first feedback, where the codebook is defined to provide feedback associated with a single DCI message.

A first network entity for wireless communication is described. The first network entity may include one or more memories storing processor executable code, and one or more processors coupled with the one or more memories. The one or more processors may individually or collectively be operable to execute the code to cause the first network entity to transmit a first DCI message that schedules a first downlink shared channel message and requests that a second network entity provide first feedback with respect to the first downlink shared channel message and receive, via a codebook and based on transmission of the first DCI message, a feedback indication that is associated with the first feedback, where the codebook is defined to provide feedback associated with a single DCI message.

Another first network entity for wireless communication is described. The first network entity may include means for transmitting a first DCI message that schedules a first downlink shared channel message and requests that a second network entity provide first feedback with respect to the first downlink shared channel message and means for receiving, via a codebook and based on transmission of the first DCI message, a feedback indication that is associated with the first feedback, where the codebook is defined to provide feedback associated with a single DCI message.

A non-transitory computer-readable medium storing code for wireless communication is described. The code may include instructions executable by one or more processors to transmit a first DCI message that schedules a first downlink shared channel message and requests that a second network entity provide first feedback with respect to the first downlink shared channel message and receive, via a codebook and based on transmission of the first DCI message, a feedback indication that is associated with the first feedback, where the codebook is defined to provide feedback associated with a single DCI message.

Some examples of the method, first network entities, and non-transitory computer-readable medium described herein may further include operations, features, means, or instructions for transmitting a second DCI message that schedules a second downlink shared channel message and requests that the second network entity provide second feedback with respect to the second downlink shared channel message, where provision of the second feedback may be scheduled by the second DCI message to overlap with provision of the first feedback, where the overlap may be associated with an error condition based on the codebook being defined to provide feedback for a single DCI message.

Some examples of the method, first network entities, and non-transitory computer-readable medium described herein may further include operations, features, means, or instructions for transmitting a second DCI message that schedules a second downlink shared channel message and requests that the second network entity provide second feedback with respect to the second downlink shared channel message, where provision of the second feedback may be scheduled by the second DCI message to overlap with provision of the first feedback; and where receiving the feedback indication via the codebook includes and receiving bundled feedback that may be associated with the first feedback and with the second feedback, where the bundled feedback may be included in the codebook and may be associated with an exception based on the overlap.

In some examples of the method, first network entities, and non-transitory computer-readable medium described herein, a payload size of the feedback indication may be equal to a quantity of CBGs included in the first downlink shared channel message.

In some examples of the method, first network entities, and non-transitory computer-readable medium described herein, a payload size of the feedback indication may be equal to a quantity of codewords included in the first downlink shared channel message.

Some examples of the method, first network entities, and non-transitory computer-readable medium described herein may further include operations, features, means, or instructions for receiving a scheduled uplink shared channel message that may be punctured with reception of the feedback indication based on an overlap between the scheduled uplink shared channel message and provision of the first feedback.

A network entity for wireless communication is described. The network entity may include a processing system configured to receive a first DCI message that schedules a first downlink shared channel message and requests that the network entity provide first feedback with respect to the first downlink shared channel message, determine a codebook based on reception of the first downlink shared channel message, where the codebook is defined to provide feedback associated with a single DCI message, and transmit a feedback indication that is associated with the first feedback.

In some examples of the network entity, the processing system may be configured to receive a second DCI message that schedules a second downlink shared channel message and requests that the network entity provide second feedback with respect to the second downlink shared channel message, where provision of the second feedback may be scheduled by the second DCI message to overlap with provision of the first feedback, where the overlap may be associated with an error condition based on the codebook being defined to provide feedback for a single DCI message; and where to determine the codebook, the processing system may be configured to and populate the codebook with the first feedback.

In some examples of the network entity, the processing system may be configured to receive a second DCI message that schedules a second downlink shared channel message and requests that the network entity provide second feedback with respect to the second downlink shared channel message, where provision of the second feedback may be scheduled by the second DCI message to overlap with provision of the first feedback; and where to determine the codebook, the processing system may be configured to and populate the codebook with bundled feedback that may be based on the first feedback associated with the first DCI message and on the second feedback associated with the second DCI message, where inclusion of the bundled feedback in the codebook that may be defined to provide feedback associated with a single DCI message may be an exception based on the overlap.

In some examples of the network entity, to determine the codebook, the processing system may be configured to include the first feedback in the codebook on a per-CBG basis when CBG feedback may be enabled, where a payload size of the codebook may be based on a quantity of CBGs associated with the first downlink shared channel message.

In some examples of the network entity, the payload size of the codebook may be equal to the quantity of CBGs associated with the first downlink shared channel message.

In some examples of the network entity, to determine the codebook, the processing system may be configured to include the first feedback in the codebook on a per-codeword basis, where a payload size of the codebook may be based on a quantity of codewords associated with the first downlink shared channel message.

In some examples of the network entity, the payload size of the codebook may be equal to the quantity of codewords associated with the first downlink shared channel message.

In some examples of the network entity, to transmit the feedback indication associated with the first feedback, the processing system may be configured to puncture a scheduled uplink shared channel message with transmission of the feedback indication based on an overlap between the scheduled uplink shared channel message and provision of the first feedback.

In some examples of the network entity, the scheduled uplink shared channel message may be punctured by transmission of the feedback indication when a payload size of the codebook satisfies a threshold payload size.

In some examples of the network entity, to transmit the feedback indication associated with the first feedback, the processing system may be configured to rate match a scheduled uplink shared channel message with transmission of the feedback indication based on an overlap between the scheduled uplink shared channel message and provision of the first feedback when a payload size of the codebook satisfies a threshold payload size.

In some examples of the network entity, the network entity may be configured to use the codebook as a fallback codebook when multiple different codebooks may be configured and provision of respective feedback for each of the multiple different codebooks may be scheduled to overlap.

In some examples of the network entity, transmission of the feedback indication may be in accordance with the codebook and may be based on the fallback codebook being prioritized over non-fallback codebooks.

In some examples of the network entity, transmission of the feedback indication may be in accordance with a second codebook different from the codebook and the feedback indication includes the first feedback multiplexed with second feedback associated with the second codebook.

Another first network entity for wireless communication is described. The first network entity may include a processing system configured to transmit a first DCI message that schedules a first downlink shared channel message and requests that a second network entity provide first feedback with respect to the first downlink shared channel message, and receive, via a codebook and based on transmission of the first DCI message, a feedback indication that is associated with the first feedback, where the codebook is defined to provide feedback associated with a single DCI message.

In some examples of the first network entity, the processing system may be further configured to transmit a second DCI message that schedules a second downlink shared channel message and requests that the second network entity provide second feedback with respect to the second downlink shared channel message, where provision of the second feedback may be scheduled by the second DCI message to overlap with provision of the first feedback, where the overlap may be associated with an error condition based on the codebook being defined to provide feedback for a single DCI message.

In some examples of the first network entity, the processing system may be configured to transmit a second DCI message that schedules a second downlink shared channel message and requests that the second network entity provide second feedback with respect to the second downlink shared channel message, where provision of the second feedback may be scheduled by the second DCI message to overlap with provision of the first feedback; and where to receive the feedback indication via the codebook, the processing system may be configured to and receive bundled feedback that may be associated with the first feedback and with the second feedback, where the bundled feedback may be included in the codebook and may be associated with an exception based on the overlap.

In some examples of the first network entity, a payload size of the feedback indication may be equal to a quantity of CBGs included in the first downlink shared channel message.

In some examples of the first network entity, a payload size of the feedback indication may be equal to a quantity of codewords included in the first downlink shared channel message.

In some examples of the first network entity, the processing system may be configured to receive a scheduled uplink shared channel message that may be punctured with reception of the feedback indication based on an overlap between the scheduled uplink shared channel message and provision of the first feedback.

DETAILED DESCRIPTION

Figure 1:
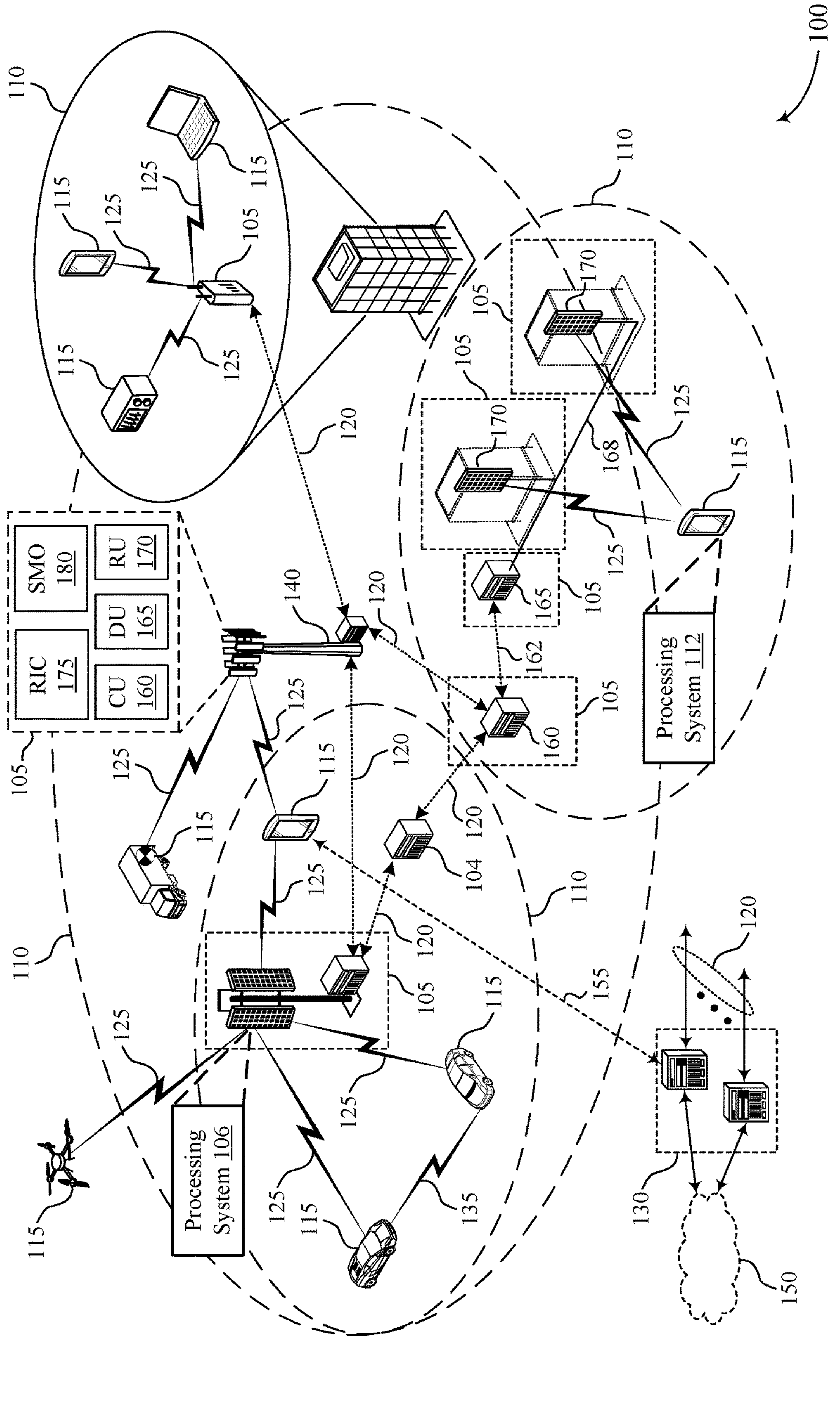
FIG. 1 shows an example of a wireless communications system that supports simplified design for fixed size codebooks in accordance with one or more aspects of the present disclosure.

Some wireless communications systems may support different codebooks for transmissions. For example, a user equipment (UE) may use a fixed size codebook or a dynamic size codebook for feedback signaling (e.g., hybrid automatic repeat request (HARQ) feedback) related to received messages scheduled by downlink control information (DCI), including Type-I and Type-II codebooks, respectively. UEs may also use multiplexing to transmit feedback for multiple separate transmissions within a single feedback message. Type-II codebooks may in some cases be used to reduce a quantity of bits in a feedback message by updating a codebook size dynamically based on a quantity of messages for which to provide feedback as well as their contents. In contrast, Type-I codebooks may include a fixed or deterministic size (or semi-statically configured size) to accommodate each supported configuration and variations in multiplexed feedback transmissions. Type-I codebooks may thus represent a less efficient, but more robust design compared to Type-II codebooks. However, as additional configurations are introduced to telecommunications along with new potential messaging requesting feedback, a fixed Type-I codebook size may increase further. As a result, Type-I codebooks may be used less as Type-II codebooks may be favored more frequently to reduce a size of feedback messaging.

As described herein, a simplified fixed size codebook design (e.g., HARQ codebook design) may be implemented with a limited functionality. For example, Type-I codebooks may be designed to be used for reporting feedback for messages scheduled by a single DCI in communications where feedback multiplexing may be avoided (e.g., sparse or low coverage scenarios). As a result, a robustness in communications may be improved through more frequent use of fixed size codebooks. Further, communication latency and resource usage in a network may be improved as one or more downlink assignment indicators (DAIs) used for Type-II codebooks may be omitted from one or more DCI messages when using simplified Type-I codebooks. Additionally, rules may be included to handle various exceptions and to expand Type-I codebook usage. For example, a network entity (e.g., a base station) and a UE implementing a Type-I codebook may consider overlapping feedback resources for different DCIs as an error case. Additionally, or alternatively, a network entity may allow overlap in scheduling, and a UE may bundle feedback into a single bit to indicate if at least one of multiple DCIs are missed. A Type-I codebook size may in some cases be based on a quantity of code-block groups (CBGs) or a quantity of codewords in a transport block (TB), and may be used for fallback DCI. Further, puncturing or rate matching operations may be performed when provision (e.g., usage of scheduled resources) of a DCI overlaps with provision of one or more uplink message transmissions.

Aspects of the disclosure are initially described in the context of wireless communications systems. Aspects of the disclosure are further illustrated by and described with reference to wireless communications systems, codebook diagrams, signal diagrams, resource provision diagrams, and process flows that relate to simplified design for fixed size codebooks. Aspects of the disclosure are further illustrated by and described with reference to apparatus diagrams, system diagrams, and flowcharts that relate to simplified design for fixed size codebooks.

FIG. 1 shows an example of a wireless communications system 100 that supports simplified design for fixed size codebooks in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as a network 105. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity (e.g., network entity 105) may include a processing system 106. Similarly, the network entity (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an “input” and “input information” may be used interchangeably. Similarly, as described herein, an “output” and “output information” may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). In some examples, a codebook may include one or more parameters or configurations for use in transmissions. Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support different codebooks for transmissions. For example, a UE 115 may use a fixed size Type-I codebook or a dynamic size Type-II codebook for feedback signaling, including HARQ feedback for physical downlink shared channel (PDSCH) messages scheduled by DCI messaging. UEs may also use multiplexing to transmit feedback for multiple separate transmissions within a single feedback message. Although Type-I codebooks may be more robust compared to Type-II codebooks, a size of a Type-I codebook may continue to increase as new messaging and configuration are defined or added to the wireless communications system 100. As a result, Type-I codebooks may be used less as Type-II codebooks may be favored more frequently to reduce a size of feedback messaging.

As described herein, a simplified fixed size codebook design (e.g., HARQ codebook design) may be implemented with a limited functionality. For example, the wireless communications system 100 may implement a simplified Type-I codebook designed to be used for reporting feedback for messages scheduled by a single DCI message. In some cases, the simplified Type-I codebook may be used in communications where feedback multiplexing may be avoided (e.g., sparse or low coverage scenarios), and as a result, a robustness in communications may be improved through more frequent use of fixed size codebooks. Further, communication latency and resource usage in a network may be improved as one or more DAIs used for Type-II codebooks may be omitted from one or more DCI messages when using simplified Type-I codebooks.

Figure 2:
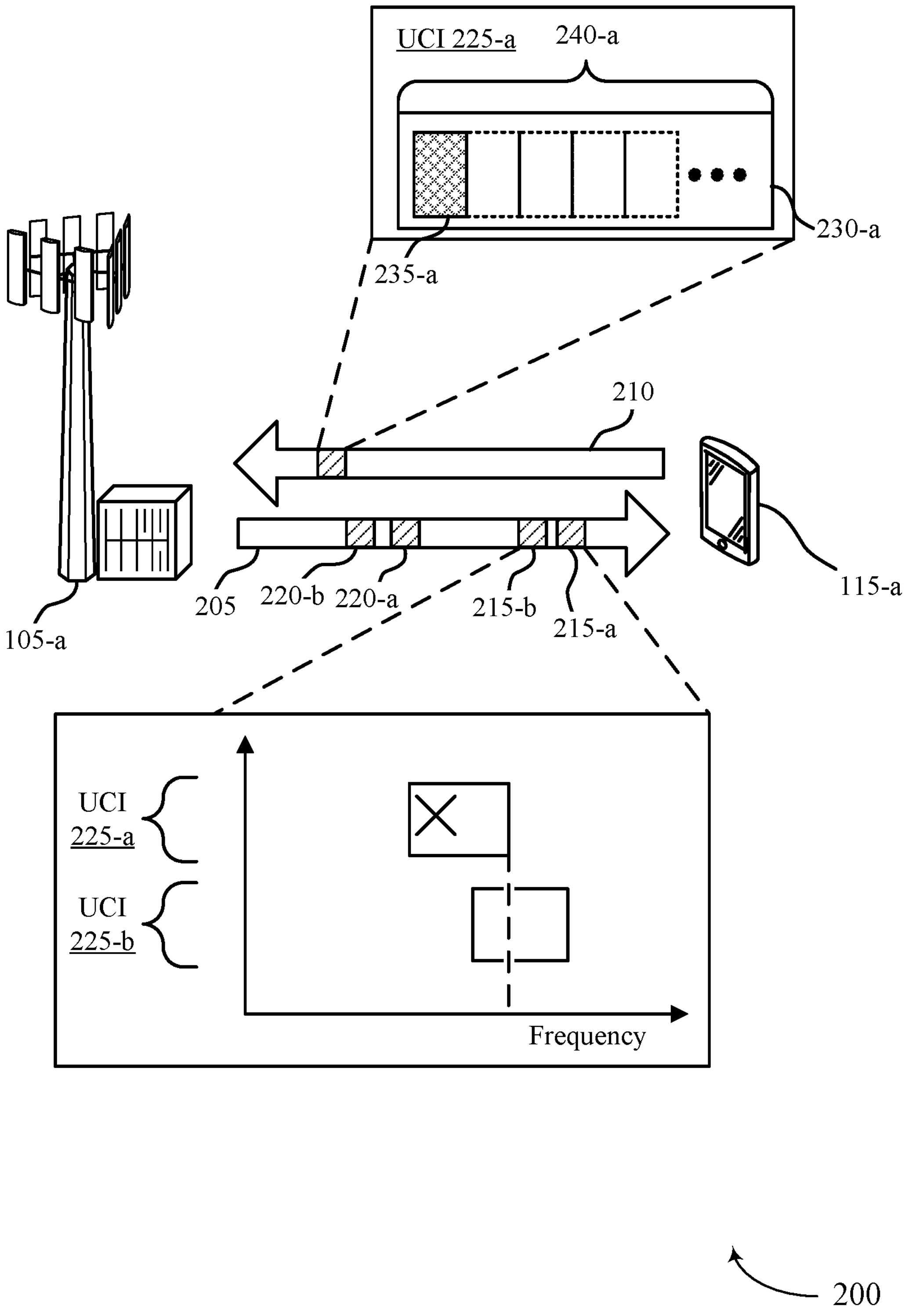
FIG. 2 shows an example of a wireless communications system that supports simplified design for fixed size codebooks in accordance with one or more aspects of the present disclosure.

FIG. 2 shows an example of a wireless communications system 200 that supports simplified design for fixed size codebooks in accordance with one or more aspects of the present disclosure. In some examples, the wireless communications system 200 may implement or be implemented by aspects of the wireless communications system 100. For example, the wireless communications system 200 may include one or more UEs 115, including a UE 115-*a*, and one or more network entities, including a network entity 105-*a*, which may each be examples of UEs 115, network entities 105, or other receiving and transmitting devices described with respect to FIG. 1. The UE 115-*a* may also include a downlink communications link 205 and an uplink communications link 210 with the network entity 105-*a* for receiving and transmitting one or more communications. In some cases, the wireless communications system 200 may support a simplified design for a fixed size codebook as described herein.

For example, the wireless communications system 200 may support multiple different codebooks for use in transmitting feedback for communications. In some examples, the network entity 105-*a* (or one or more additional network entities 105) may transmit one or more DCI messages 215 to the UE 115-*a*, where each DCI message 215 may include one or more downlink grants scheduling transmission of one or more downlink messages 220 (e.g., PDSCH messages). In some cases, the DCI messages 215 may also request (or schedule via an uplink grant) feedback to indicate whether each corresponding downlink message 220 was successfully received or not at the UE 115-*a*. After receiving multiple DCI messages 215 and monitoring for reception of one or more corresponding downlink messages 220, the UE 115-*a* may multiplex feedback for the multiple DCI messages 215 (and corresponding downlink messages 220) for transmission in an uplink control information (UCI) message 225. In some examples, the UE 115-*a* may populate a codebook 230 for transmitting the feedback in the UCI message 225. The network entity 105-*a* may receive the UCI message, and using the codebook, may decode the feedback.

In some examples, the UE 115-*a* may support a Type-II codebook to reduce a payload size 240 of feedback in UCI messages 225, where a Type-II codebook may be a dynamic codebook with a dynamic size. For example, the UE 115-*a* may dynamically change a size of a Type-II codebook based on a quantity of successfully received downlink messages 220 by omitting one or more feedback bits for missed downlink messages 220. In some examples, each DCI message 215 may include one or more DAI fields (e.g., a counter DAI field, a total DAI field) that may indicate a count associated with each downlink message 220, which may be used by the UE 115-*a* to detect whether one or more DCI messages 215 and corresponding downlink messages 220 were missed. Thus, the UE 115-*a* may include one or more negative acknowledgments (NACKs) in the codebook for detected missed transmissions, and may include one or more acknowledgments (ACKs) in one the codebook to indicate received transmissions. Notably, a size of the codebook may still be reduced as the UE 115-*a* will report on received and missed transmissions, but not on all possible transmissions of a configuration.

By way of another example, the UE 115-*a* may support a Type-I codebook, which may be an example of a semi-static codebook with a fixed size. In some cases, Type-I codebooks may improve a robustness in codebook sizes compared to Type-II codebooks. For example, a fixed size of a Type-I codebook may remain the same and not change with scheduling decisions of the network entity 105-*a*, and may instead correspond to a deterministic quantity of bits (e.g., having an unambiguous quantity of bits known by the UE 115-*a* and the network entity 105-*a*). After receiving one or more DCI messages 215 and corresponding downlink messages 220, the UE 115-*a* may include one or more ACKs for received transmissions, and one or more NACKs for missed transmissions in the codebook. The Type-I codebook may also include additional NACK padding (e.g., dummy bits) in bit locations corresponding to potential configured messaging that is either missed or not configured at the UE 115-*a* at a time of the feedback transmission.

Type-I codebooks may thus provide a robust solution to indicate any potentially received transmission, and thus may reduce an overhead or size of DCI messages 215 as DAI fields may not be used in Type-I codebook feedback messaging. However, as one or more configurations and new potential messaging requiring feedback expands in telecommunications, a deterministic Type-I codebook size may continue to increase to cover each possible feature and message that is introduced. This may result in excessive NACK padding for scenarios in which feedback for a relatively small quantity of transmissions is sent. For example, Type-I codebooks may be useful for transmitting feedback for a large quantity of received downlink messages 220 (e.g., during heavier service from the network entity 105-*a*). However, the network entity 105-*a* may communicate with multiple UEs 115, resulting in less service and communications and thus requested feedback with the UE 115-*a* (e.g., downlink transmissions may not be "full buffer" at the UE 115-*a*, or using a full buffer for service at the UE 115-*a*). The UE 115-*a* may similarly transmit less feedback in sparse coverage scenarios. Type-II codebooks may be favored frequently in the wireless communications system 200 to reduce a size of feedback messaging as UCI message transmission using Type-I codebooks may be inefficient when less messaging for the UE 115-*a* is involved.

As discussed herein, a Type-I codebook design (e.g., a fixed size codebook, a semi-static codebook) may be altered to support limited functionalities with a simplified design, and for cases that do not support the simplified Type-I codebook design, the UE 115-*a* may use a Type-II codebook instead. For example, the UE 115-*a* may support a codebook 230-*a*, which may represent a Type-I codebook that may be defined to provide feedback associated with a single DCI message 215 (e.g., defined for use when there is no feedback multiplexing performed). In some examples, the UE 115-*a* may receive the DCI message 215-*a* scheduling a downlink message 220-*a*. The UE 115-*a* may then transmit a UCI message 225-*a* (e.g., triggered by a downlink grant received in the DCI message 215-*a*), which may include a payload size 240-*a* of one or more feedback bits 235 according to the codebook 230-*a*. In some examples, there may be no other downlink grants requesting feedback in a same uplink occasion or set of uplink resources for transmitting the UCI message 225-*a*, such as for physical uplink control channel (PUCCH) signaling. Accordingly, the UCI message 225-*a* may include a single bit 235-*a* corresponding to the DCI message 215-*a* and the downlink message 220-*a*.

In some cases, a simplified Type-I codebook design may be utilized for different use cases in which the network entity 105-*a* may serve the UE 115-*a* sparsely (e.g., IoT applications, low throughput data). The payload size 240-*a* of the UCI message 225-*a* may thus represent a robust, deterministic codebook size for a single transmission (e.g., one bit) without NACK filler in the codebook 330-*a*. By using the codebook 330-*a*, the UE 115-*a* may provide robust feedback, while the network entity 105-*a* may also omit additional bits in DAI fields of DCI messages 215 to reduce a size of DCI messages 215.

In some examples, even if configured with a simple Type-I codebook, such as the codebook 330-*a*, the UE 115-*a* may receive requests for multiple feedback indications that may be scheduled with at least partially overlapping resources. For example, the UE 115-*a* may receive a second DCI message 215-*b* including a downlink grant for a downlink message 220-*b* and requesting feedback, for example, via a UCI message 225-*b*. Notably, the two DCI messages 215-*a* and 215-*b* may grant one or more uplink resources (e.g., PUCCH resources) that may overlap. In some examples, the UE 115-*a* may treat an overlap between provision of resources (e.g., use of one or more resources for a transmission) of feedback for one or more downlink messages 220 as an error case. For example, the UE 115-*a* may determine that resources for the UCI message 225-*b* overlap with resources for the UCI message 225-*a* and may cancel, or refrain from transmitting, feedback for the downlink message 220-*b* and DCI message 215-*b* based on determining an error condition. In some cases, the network entity 105-*a* may not allow scheduling decisions to be made that result in overlapping provision of resources when overlap is considered an error case.

By way of another example, the network entity 105-*a* may allow scheduling of overlapping provision of resources, where overlap may not be considered an error. In place of using feedback multiplexing, the UE 115-*a* may instead perform bundling of feedback (e.g., bundling of ACK/NACK bits) for overlapping provision of resources. For example, the UE 115-*a* may transmit a single bit, such as the bit 235-*a*, in the UCI message 225-*a*, where the bit 235-*a* may indicate a NACK if at least one of the downlink messages 220-*a* and 220-*b* (e.g., PDSCH messages) is missed or not detected, or fails in decoding. In contrast, the UE 115-*a* may transmit an ACK if both of the downlink messages 220-*a* and 220-*b* are correctly received and decoded. In some cases, the UE 115-*a* may perform a logical AND operation of one or more ACK/NACK bits (e.g., ACK=1, NACK=0), or a NOR operation for an opposite bit assignment for ACK and NACK (e.g., ACK=0, NACK=1). In some examples, feedback bundling may be used in high reliability communications, as feedback bundling may not indicate whether one or more DCI messages 215 are missed. For example, the network entity 105-*a* may interpret the downlink message 220-*b* as successfully received and passing decoding if the UE 115-*a* reports successful receipt and reporting of the DCI message 215-*a* and downlink message 220-*a*, while missing the DCI message 215-*b* and downlink message 220-*b*.

Figure 3A:
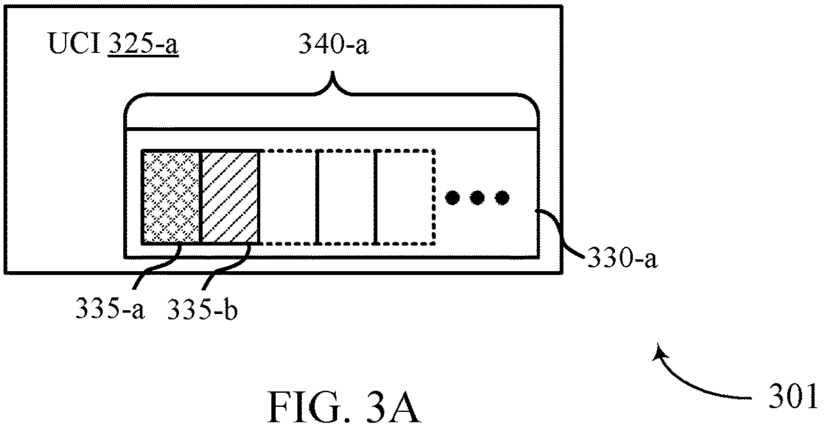
FIGS. 3A-3C show examples of a codebook diagram, a signal diagram, and a resource provision diagram that support simplified design for fixed size codebooks in accordance with one or more aspects of the present disclosure.
Figure 3B:
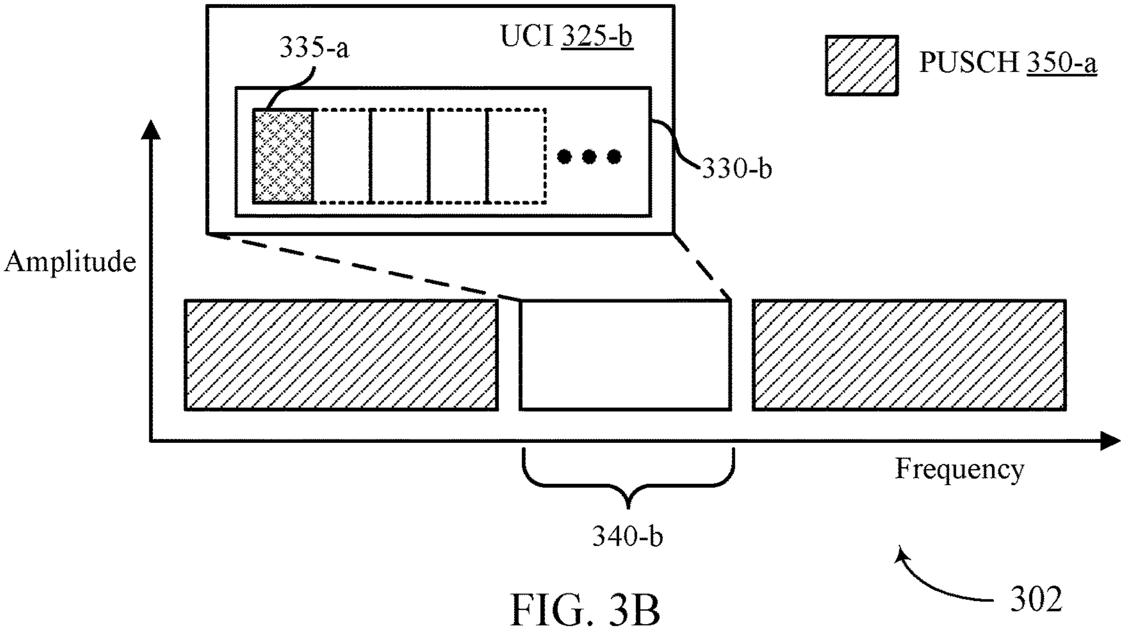
Figure 3C:
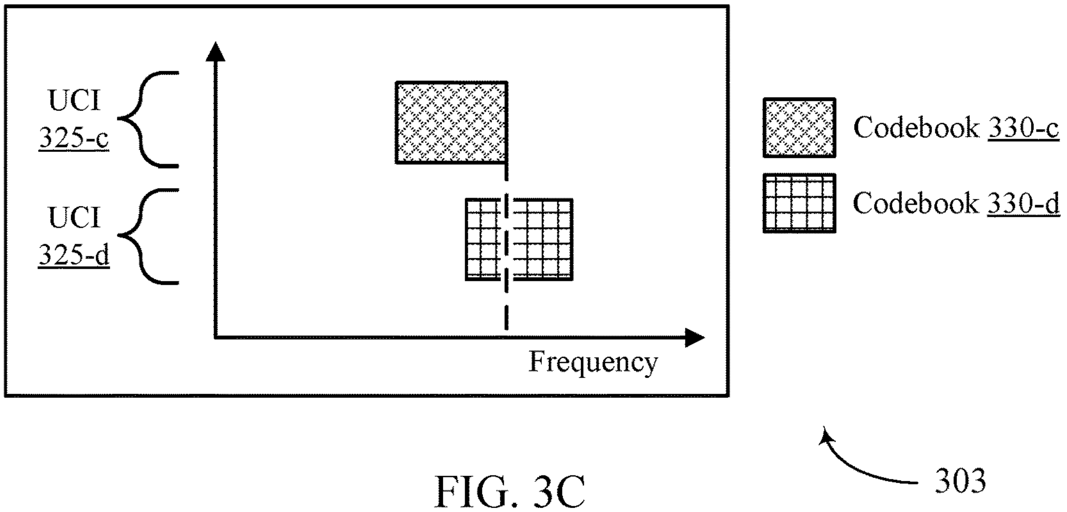

FIG. 3A shows an example of a codebook diagram 301, FIG. 3B shows an example of a signal diagram 302, and FIG. 3C shows an example of a resource provision diagram 303 that supports simplified design for fixed size codebooks in accordance with one or more aspects of the present disclosure. In some examples, the codebook diagram 301, the signal diagram 302, and the resource provision diagram 303 may implement or be implemented by aspects of the wireless communications system 100 or the wireless communications system 200 and may, for example, illustrate codebooks, signals, and resources for simplified Type-I codebook design.

In some examples, a UE 115 may be configured for reporting ACK/NACK feedback for one or more CBGs received in one or more TBs of one or more downlink messages. Different TBs may include a different quantity of CBGs however, and thus the UE 115 may rely on reporting a TB-specific quantity of ACK/NACK bits in a codebook for each received TB. In a comprehensive Type-I codebook design for multiplexed feedback (e.g., inefficient full case design), a UE 115 may have no knowledge of a quantity of CBGs in a corresponding missing TB for a DCI missing event (e.g., the UE 115 does not receive or successfully decode a DCI message). In some cases, a UE 115 may add NACK padding to accommodate a maximum quantity of CBGs per TB (e.g., pre-configured), but this may in cases increase a size of a Type-I codebook by more than two bits.

In some examples, a codebook 330 utilizing a simplified Type-I codebook design may mitigate large codebook sizes by being based on a single applicable CBG size for one transmission. For example, if there is no multiplexing performed for feedback, a quantity of CBGs may depend on a single received TB. To illustrate, the codebook diagram 301 of FIG. 3A may include a codebook 330-*a* for use in HARQ feedback. In some cases, the UE 115-*a* may generate the codebook 330-*a* (e.g., may populate the codebook 330-*a* with one or more ACK/NACK bits for feedback transmission in a UCI message 325-*a*) based on a quantity of CBGs present in a received PDSCH transmission. For example, if two CBGs are received in a scheduled TB, the payload size 340-*a* of the codebook 330-*a* be equal to two bits, and the codebook 330-*a* may include the bits 335-*a* and 335-*b* to indicate feedback for each CBG. By basing the size of the codebook on a quantity of actual CBGs received in place of NACK padding for a total possible quantity of CBGs, an efficiency in transmissions may be improved.

Additionally, or alternatively, a UE 115 may receive a downlink message including more than one codeword. For example, a PDSCH of a rank greater than 4 may include two codewords in a TB, for which two ACK/NACK bits may be used to indicate one bit of feedback for each codeword. Similar to CBGs, a UE 115 may be unaware of a corresponding rank of a missing PDSCH if a DCI message is missed or unsuccessful in decoding, leading to ambiguity on a quantity of ACK/NACK bits to report in a HARQ codebook. In some cases, (e.g., in a more comprehensive Type-I codebook design for multiplexed feedback) a codebook may report two bits for each PDSCH (e.g., one for each codeword) regardless of rank and may use NACK padding for ranks smaller than 4, which may increase a size of feedback transmissions. Additionally, or alternatively, there may be RRC configured spatial bundling of ACK/NACK bits over the two codewords, where one ACK/NACK bit is reported for a PDSCH regardless of rank, which may lead to potential loss of information.

The codebook 330-*a* may in some examples implement a simplified Type-I codebook design to mitigate ambiguity in quantities of codewords. For example, a quantity of codewords of a PDSCH may be used to generate the codebook 330-*a* of a payload size 340-*a* corresponding to the quantity of codewords in place of NACK padding or bundling.

The signal diagram 302 of FIG. 3B may in some cases illustrate methods for multiplexing a simplified Type-I codebook into a physical uplink shared channel (PUSCH) transmission. For example, a UE 115 may provide a single bit for a codebook 330-*b* (with a codebook payload size 340-*b*=1) if feedback is not provided for CBGs or for multiple codewords. In some cases, HARQ feedback (e.g., ACK/NACK) may puncture into a PUSCH transmission for providing feedback with no more than two bits. For example, a single bit 335-*a* may be included in a UCI message 325-*b* in accordance with the codebook 330-*b* (e.g., a simplified Type-I codebook), which may puncture into (e.g., use a subset of resources of) a PUSCH message 350-*a* if provision of the UCI message 325-*b* overlaps with provision of the PUSCH message 350-*a*. In some cases, PUSCH performance impact may be limited due to the small payload size 340-*b*, and may be relatively unaffected if a DCI message requesting feedback is missed (as puncturing may be avoided). In some examples, the payload size 340-*b* may increase to up to a threshold quantity of bits (e.g., two bits) if there are multiple codewords or if there are up to a threshold quantity of CBGs (e.g., two or less) as described herein, while remaining within a puncturing region.

In some examples, when feedback for more than a threshold quantity of CBGs is configured (or feedback otherwise has a payload size 340 greater than the threshold), a UE 115 may default to puncturing the PUSCH message 350-*a* with the UCI message 325-*b* in place of rate matching the PUSCH message 350-*a* around the UCI message 325-*b*. Such puncturing may provide improved communications. For example, in other cases, a UE 115 may operate in a rate matching region, and the PUSCH message 350-*a* may rate match around the UCI message 325-*b* carrying CBG feedback according to the codebook 330-*b* if a corresponding DCI message is detected. However, if the UE 115 misses the DCI message, the PUSCH message 350-*a* may rate match assuming no ACK/NACK UCI message is provided and may be different, which may cause inconsistencies difficulty in communication at a network entity 105. In some examples, the network entity 105 (e.g., gNB) may perform blind rate matching to provide robustness, but this may add additional processing complexity at the network entity 105.

Thus, by defaulting to puncturing, even for larger quantities of CBGs and associated feedback, differences in rate matching may be avoided, which may improve a reliability and efficiency of communications. In some examples, a simplified Type-I codebook size may be limited by a threshold (e.g., upper bounded by a maximum quantity of CBGs of a network, quantity of codewords), and so an impact from puncturing to PUSCH performance may be limited or reduced. Further, for puncturing, the UCI message 325-*b* and codebook 330-*b* may use an actual quantity of CBGs received in a message to determine the payload size 340-*b* of the codebook 330-*b* in place of a quantity of total configured CBGs for the UCI message 325-*b* size.

By way of another example, the UE 115 may perform rate matching when an actual quantity of CBGs is larger, where the rate matching may be based on an actual quantity of CBGs instead of a configured quantity of CBGs. In some cases, a network entity 105 (e.g., gNB) may perform blind decoding to determine whether a DCI message including a grant is successfully received and decoded (assuming a UCI message is transmitted or not transmitted) to mitigate potential differences in rate matching. Additionally, or alternatively, the network entity 105-*a* may avoid blind decoding if a probability of a DCI message missing is below a threshold. In some examples, as the rate matching may be based on an actual quantity of received CBGs, the UCI message 325-*b* may omit padding NACK bits to reduce a size of feedback and ambiguity in communications (e.g., if the UE 115 detects the DCI message and transmits the UCI message 325-*b*).

FIG. 3C may illustrate a resource provision diagram 303 for provision of feedback for one or more DCI messages and rules regarding fallback DCI. For example, a simplified Type-I codebook may be used for fallback DCI, while Type-II codebooks may be used for non-fallback DCI (e.g., dynamically sized, more flexibly sized to be possibly larger than a simplified Type-I codebook). For example, a UE 115 and network entity 105 may both support and be configured with multiple codebooks 330, including a codebook 330-*d* that may be a Type-II codebook, where a fallback DCI message may use a codebook 330-*c*, or a Type-I codebook, instead. In some cases, a fallback DCI message may represent a different type of DCI message than a DCI message associated with Type-II codebooks, and may be used in one or more backup scenarios in place of the Type-II codebook DCI message. However, in some cases, provision of one or more non-fallback DCI messages indicating to transmit feedback (e.g., via PUCCH) may at least partially overlap with provision of a fallback DCI message indicating to provide an overlapping feedback transmission.

In some cases, overlapping of provision for fallback and non-fallback DCI message may be treated as an error case, where overlapping may not be allowed in a network. For example, feedback may be scheduled by a first DCI message for transmission in resources corresponding to a UCI message 325-*c*, which may correspond to a fallback DCI message. Further, feedback may be scheduled by a second DCI message for transmission in resources corresponding to a UCI message 325-*d*, which may correspond to one or more non-fallback DCI messages. In such an example, a UE 115 may treat overlap of the resources provision of the resources for the UCI messages 325-*c* and 325-*d* as an error, and may transmit feedback corresponding to an original or first transmission (e.g., the non-fallback DCI message, the fallback DCI message). Additionally, or alternatively, a UE 115 may introduce one or more dropping rules. For example, the UE 115 may prioritize fallback DCI, and may drop the UCI message 325-*d* associated with the non-fallback DCI. By way of another example, the UE 115 may prioritize non-fallback DCI (e.g., so more bits are transmitted), and may drop the UCI message 325-*c* associated with the fallback DCI. In some cases, priority dropping rules for fallback DCI messages may be configured via one or more messages from the network entity 105 to the UE 115, such as via RRC.

Additionally, or alternatively, fallback and non-fallback DCI associated codebooks may be multiplexed. For example, the codebook 330-*c* may include a single bit using a simplified Type-I codebook design, and the single bit may be added to the end of the codebook 330-*d*. In some cases, configurations may be set to assume overlap and to append a single bit (e.g., a dummy bit) for a Type-I codebook 330-*c* to a Type-II codebook 330-*d* even if no fallback DCI messages are detected. Additionally, or alternatively, fallback DCI messages may not support multi-codeword transmission or CBG feedback. By way of another example, a fallback DCI message may support multi-codeword transmission or CBG feedback, but when overlapping, a single bit may be added. Additionally, or alternatively, multiplexing the codebooks 330-*c* and 330-*d* may allow more than one bit for multiple CBG feedback or multiple codeword feedback. In some cases, a network entity 105 may configure dropping rules to prioritize robustness (e.g., more bits) or payload size (e.g., less bits).

Figure 4:
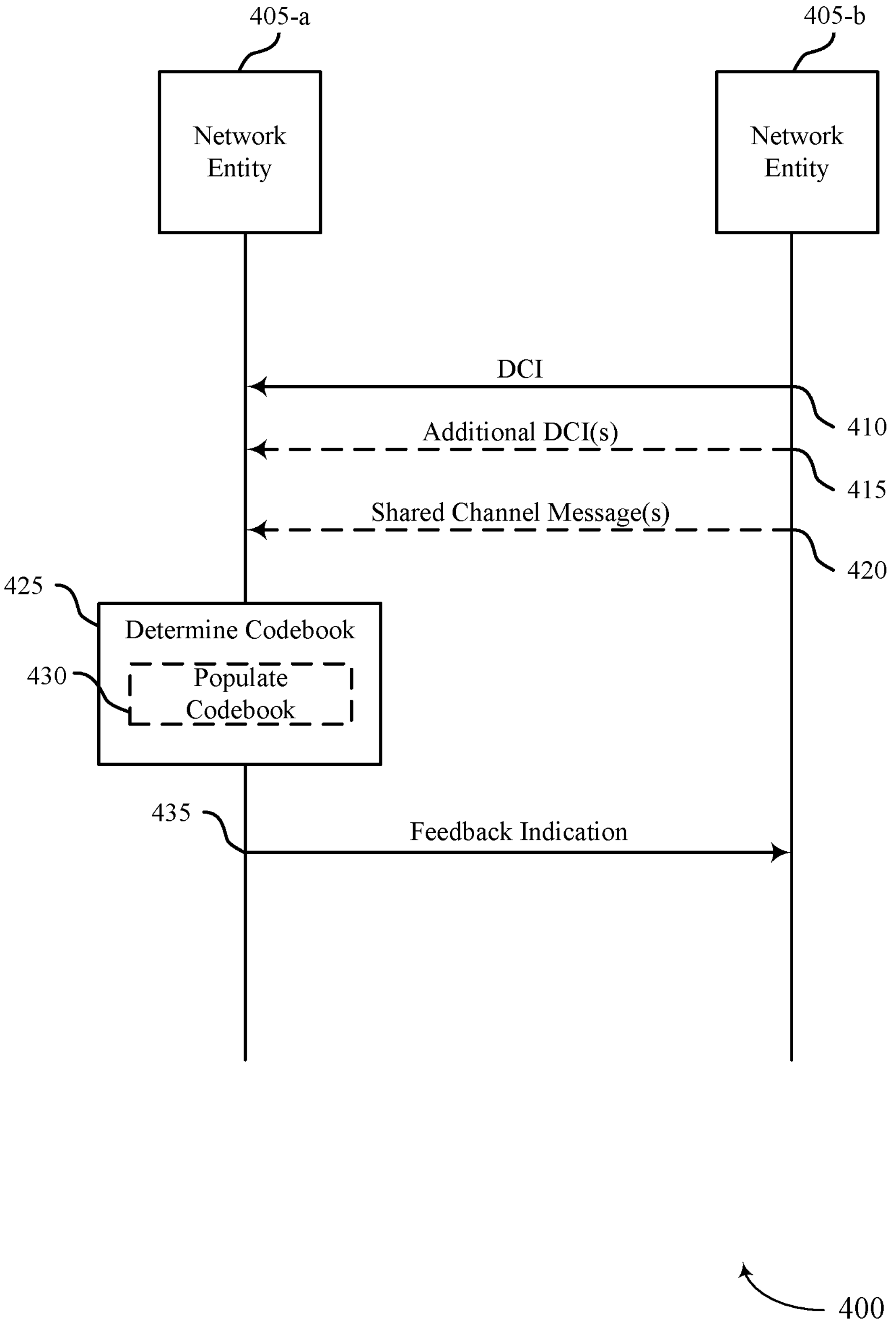
FIG. 4 shows an example of a process flow that supports simplified design for fixed size codebooks in accordance with one or more aspects of the present disclosure.

FIG. 4 shows an example of a process flow 400 that supports simplified design for fixed size codebooks in accordance with one or more aspects of the present disclosure. In some examples, the process flow 400 may implement or be implemented by aspects of the wireless communications system 100, the wireless communications system 200, the codebook diagram 301, the signal diagram 302, the resource provision diagram 303, or any combination thereof. For example, the process flow 400 may include one or more network entities, including a network entity 405-*a* (e.g., a UE 115) and a network entity 405-*b* (e.g., a base station, a CU, a DU, an RU). In some cases, the network entity 405-*a* and the network entity 405-*b* may support a simplified Type-I codebook design as described herein.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or at least partially concurrently.

At 410, the network entity 405-*a* may receive (e.g., receive directly or obtain via one or more components or devices), and the network entity 405-*b* may transmit (e.g., transmit directly or output via one or more components or devices) a first DCI message that schedules a first downlink shared channel message (e.g., a PDSCH) and requests that the network entity 405-*a* provide first feedback with respect to the first downlink shared channel message.

At 415, the network entity 405-*a* may optionally receive, and the network entity 405-*b* may optionally transmit, one or more additional DCIs messages. For example, the network entity 405-*a* may receive a second DCI message that schedules a second downlink shared channel message and requests that the network entity 405-*a* provide second feedback with respect to the second downlink shared channel message. In some examples, provision of the second feedback may be scheduled by the second DCI message to overlap with provision of the first feedback. The overlap may also be associated with an error condition based on a codebook being defined to provide feedback for a single DCI message. Additionally, or alternatively, the network entity 405-*a* may receive a third DCI message that schedules a third downlink shared channel message and requests that the network entity provide third feedback with respect to the third downlink shared channel message, where provision of the third feedback may be scheduled by the third DCI message to overlap with provision of the first feedback.

At 420, the network entity 405-*a* may optionally receive, and the network entity 405-*b* may optionally transmit, one or more downlink shared channel messages (e.g., PDSCH messages), including one or more of the first downlink shared channel message, the second downlink shared channel message, or the third downlink shared channel message.

At 425, the network entity 405-*a* may determine a codebook (e.g., a simplified Type-I codebook) based on reception of the first downlink shared channel message, where the codebook may be defined to provide feedback associated with a single DCI message. In some examples, the network entity 405-*a* may be configured to use the codebook as a fallback codebook when multiple different codebooks are configured and provision of respective feedback for each of the multiple different codebooks are scheduled to overlap.

In some examples, determining the codebook may involve including the first feedback in the codebook on a per-CBG basis when CBG feedback is enabled, where a payload size of the codebook may be based on a quantity of CBGs associated with the first downlink shared channel message. In some examples, the payload size of the codebook may be equal to the quantity of CBGs associated with (e.g., included in) the first downlink shared channel message. Additionally, or alternatively, determining the codebook may involve including the first feedback in the codebook on a per-codeword basis, where a payload size of the codebook may be based on a quantity of codewords associated with the first downlink shared channel message. In some examples, the payload size of the codebook may be equal to the quantity of codewords associated with (e.g., included in) the first downlink shared channel message.

In some examples, determining the codebook may involve populating the codebook with one or more bits of feedback. For example, at 430, when an overlap between provision of the first feedback and provision of the second feedback is associated with an error condition, the network entity 405-*a* may optionally populate the codebook with the first feedback. Additionally, or alternatively, one or more exceptions may be defined. For example, when provision of the third feedback overlaps with provision of the first feedback, the network entity 405-*a* may populate the codebook with bundled feedback that is based on the first feedback associated with the first DCI message and on the third feedback associated with the third DCI message. In some cases, inclusion of the bundled feedback in the codebook that is defined to provide feedback associated with a single DCI message may represent an exception based on the overlap.

At 435, the network entity 405-*a* may transmit, and the network entity 405-*b* may receive, a feedback indication (e.g., via a UCI message message) that is associated with the first feedback. In some examples, the network entity 405-*b* may receive the feedback indication via a codebook, such as the codebook determined at 425, and based on transmission of the first DCI message, or based on a second codebook (e.g., a Type-II codebook).

In some examples, transmitting the feedback indication associated with the first feedback may involve puncturing a scheduled uplink shared channel message (e.g., PUSCH message) with transmission of the feedback indication based on an overlap between the scheduled uplink shared channel message and provision of the first feedback. In some examples, the scheduled uplink shared channel message may be punctured by transmission of the feedback indication when a payload size of the codebook satisfies a threshold payload size. Additionally, or alternatively, transmitting the feedback indication associated with the first feedback may involve rate matching a scheduled uplink shared channel message with transmission of the feedback indication based on an overlap between the scheduled uplink shared channel message and provision of the first feedback when a payload size of the codebook satisfies a threshold payload size.

In some cases, transmitting (and receiving) the feedback indication via the codebook may involve transmitting (and receiving) bundled feedback that is associated with the first feedback and with the second feedback, where the bundled feedback is included in the codebook and is associated with an exception based on the overlap. In some examples, when network entity 405-*a* is configured to use the codebook as a fallback codebook, transmission of the feedback indication may be in accordance with the codebook and based on the fallback codebook being prioritized over non-fallback codebooks. Additionally, or alternatively, transmission of the feedback indication may be in accordance with a second codebook (e.g., Type-II codebook) different from the codebook, where the feedback indication may include the first feedback multiplexed with second feedback associated with the second codebook.

Figure 5:
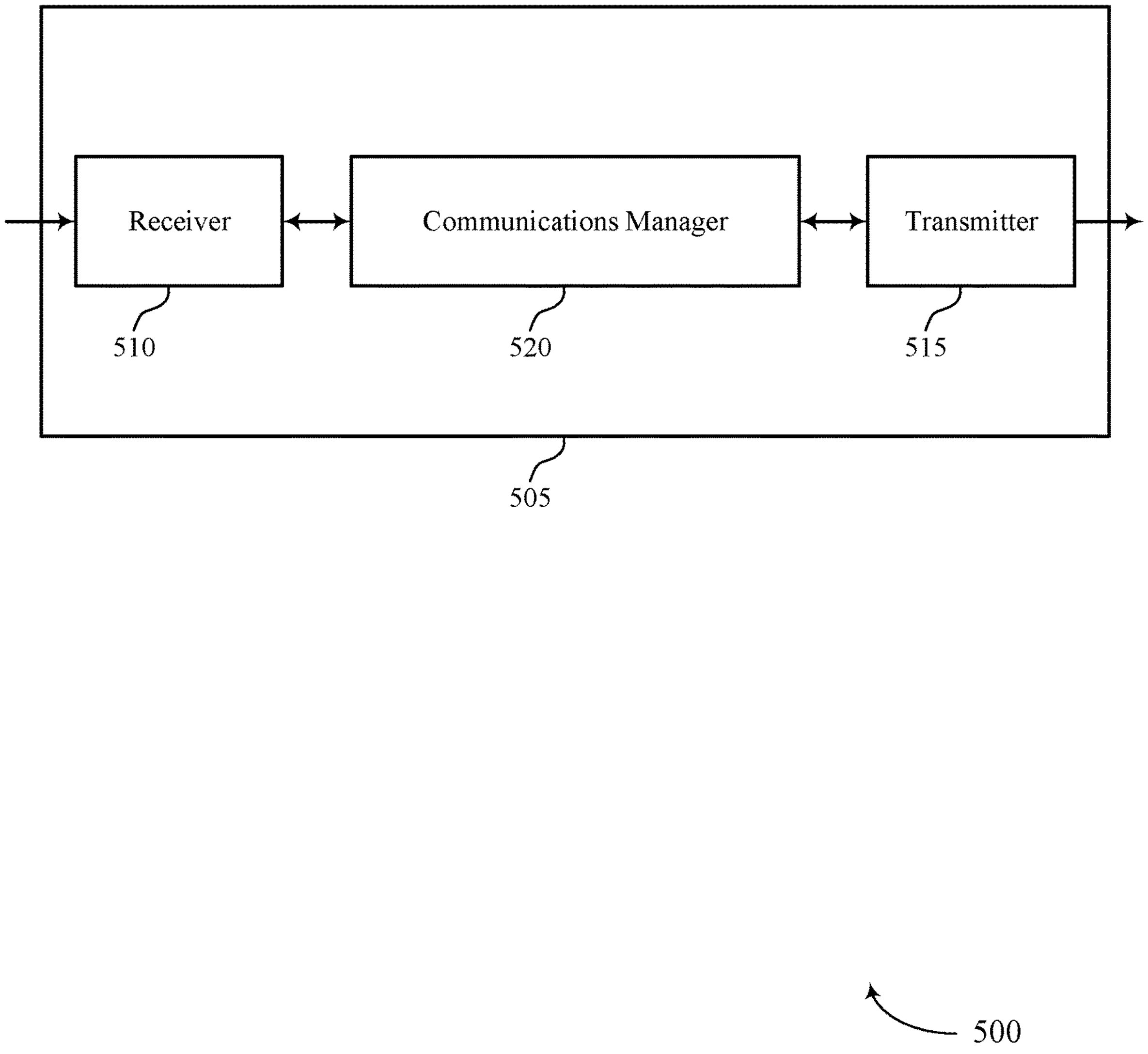
FIGS. 5 and 6 show block diagrams of devices that support simplified design for fixed size codebooks in accordance with one or more aspects of the present disclosure.

FIG. 5 shows a block diagram 500 of a device 505 that supports simplified design for fixed size codebooks in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to simplified design for fixed size codebooks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to simplified design for fixed size codebooks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of simplified design for fixed size codebooks as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving a first DCI message that schedules a first downlink shared channel message and requests that the network entity provide first feedback with respect to the first downlink shared channel message. The communications manager 520 is capable of, configured to, or operable to support a means for determining a codebook based on reception of the first downlink shared channel message, where the codebook is defined to provide feedback associated with a single DCI message. The communications manager 520 is capable of, configured to, or operable to support a means for transmitting a feedback indication that is associated with the first feedback.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources by supporting a simplified semi-static codebook (e.g., simplified Type-I codebook) design.

Figure 6:
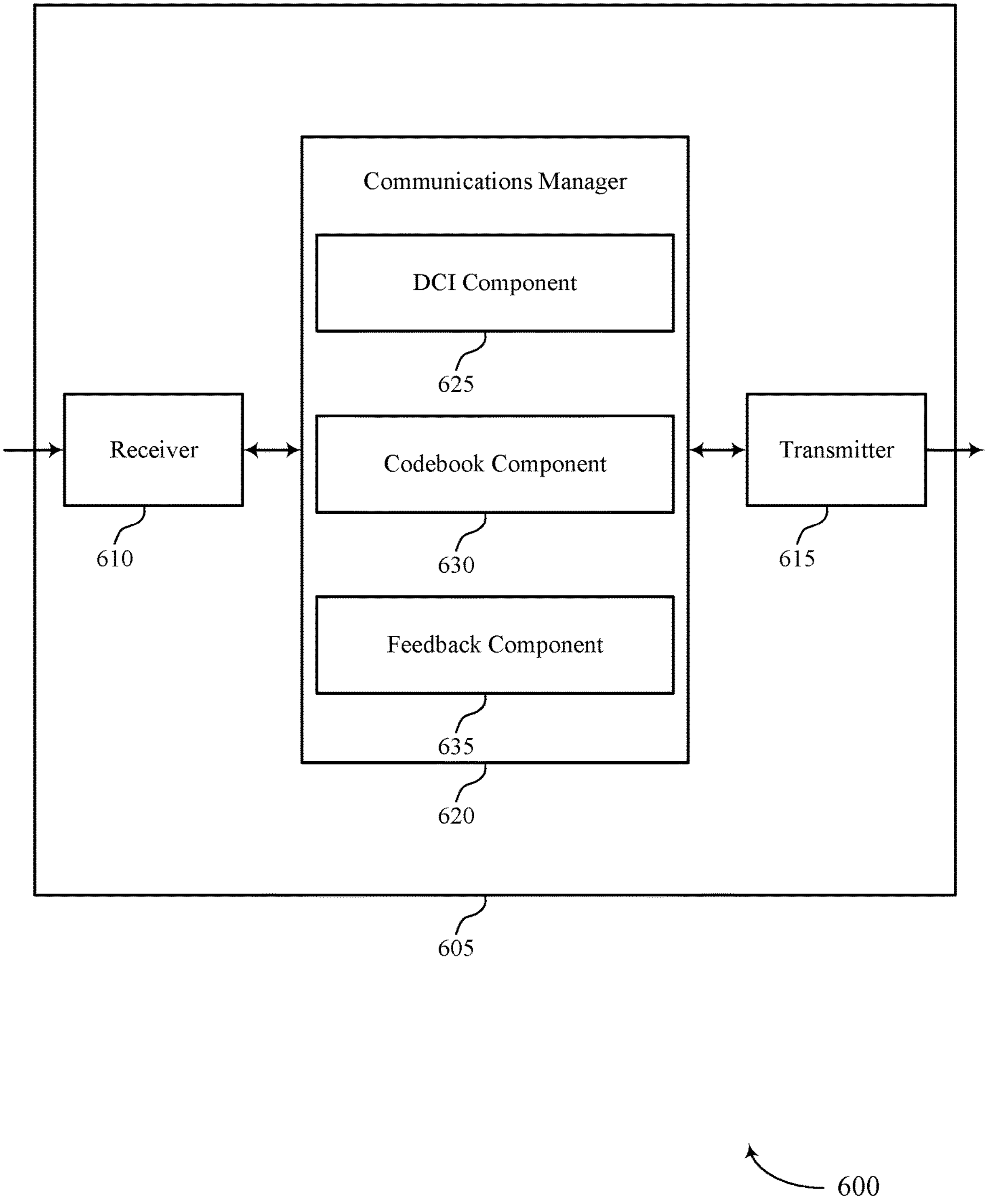

FIG. 6 shows a block diagram 600 of a device 605 that supports simplified design for fixed size codebooks in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to simplified design for fixed size codebooks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to simplified design for fixed size codebooks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of simplified design for fixed size codebooks as described herein. For example, the communications manager 620 may include a DCI component 625, a codebook component 630, a feedback component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The DCI component 625 is capable of, configured to, or operable to support a means for receiving a first DCI message that schedules a first downlink shared channel message and requests that the network entity provide first feedback with respect to the first downlink shared channel message. The codebook component 630 is capable of, configured to, or operable to support a means for determining a codebook based on reception of the first downlink shared channel message, where the codebook is defined to provide feedback associated with a single DCI message. The feedback component 635 is capable of, configured to, or operable to support a means for transmitting a feedback indication that is associated with the first feedback.

Figure 7:
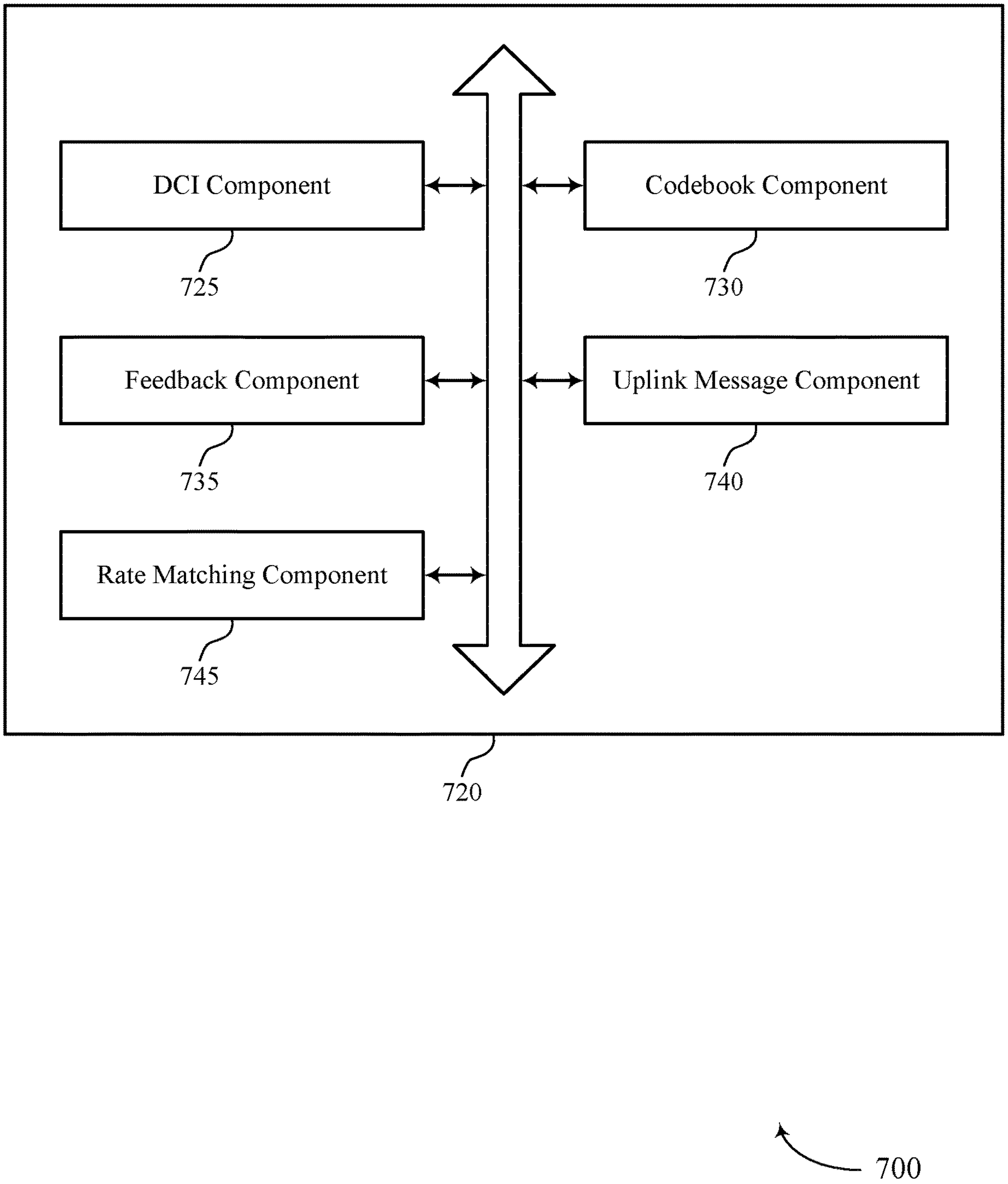
FIG. 7 shows a block diagram of a communications manager that supports simplified design for fixed size codebooks in accordance with one or more aspects of the present disclosure.

FIG. 7 shows a block diagram 700 of a communications manager 720 that supports simplified design for fixed size codebooks in accordance with one or more aspects of the present disclosure. The communications manager 720 may be an example of aspects of a communications manager 520, a communications manager 620, or both, as described herein. The communications manager 720, or various components thereof, may be an example of means for performing various aspects of simplified design for fixed size codebooks as described herein. For example, the communications manager 720 may include a DCI component 725, a codebook component 730, a feedback component 735, an uplink message component 740, a rate matching component 745, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The DCI component 725 is capable of, configured to, or operable to support a means for receiving a first DCI message that schedules a first downlink shared channel message and requests that the network entity provide first feedback with respect to the first downlink shared channel message. The codebook component 730 is capable of, configured to, or operable to support a means for determining a codebook based on reception of the first downlink shared channel message, where the codebook is defined to provide feedback associated with a single DCI message. The feedback component 735 is capable of, configured to, or operable to support a means for transmitting a feedback indication that is associated with the first feedback.

In some examples, the DCI component 725 is capable of, configured to, or operable to support a means for receiving a second DCI message that schedules a second downlink shared channel message and requests that the network entity provide second feedback with respect to the second downlink shared channel message, where provision of the second feedback is scheduled by the second DCI message to overlap with provision of the first feedback, where the overlap is associated with an error condition based on the codebook being defined to provide feedback for a single DCI message; and where determining the codebook includes populating the codebook with the first feedback. In some examples, the codebook component 730 is capable of, configured to, or operable to support a means for populating the codebook with the first feedback.

In some examples, the DCI component 725 is capable of, configured to, or operable to support a means for receiving a second DCI message that schedules a second downlink shared channel message and requests that the network entity provide second feedback with respect to the second downlink shared channel message, where provision of the second feedback is scheduled by the second DCI message to overlap with provision of the first feedback; and where determining the codebook includes populating the codebook with bundled feedback that is based on the first feedback associated with the first DCI message and on the second feedback associated with the second DCI message, where inclusion of the bundled feedback in the codebook that is defined to provide feedback associated with a single DCI message is an exception based on the overlap. In some examples, the codebook component 730 is capable of, configured to, or operable to support a means for populating the codebook with bundled feedback that is based on the first feedback associated with the first DCI message and on the second feedback associated with the second DCI message, where inclusion of the bundled feedback in the codebook that is defined to provide feedback associated with a single DCI message is an exception based on the overlap.

In some examples, to support determining the codebook, the codebook component 730 is capable of, configured to, or operable to support a means for including the first feedback in the codebook on a per-CBG basis when CBG feedback is enabled, where a payload size of the codebook is based on a quantity of CBGs associated with the first downlink shared channel message.

In some examples, the payload size of the codebook is equal to the quantity of CBGs associated with the first downlink shared channel message.

In some examples, to support determining the codebook, the codebook component 730 is capable of, configured to, or operable to support a means for including the first feedback in the codebook on a per-codeword basis, where a payload size of the codebook is based on a quantity of codewords associated with the first downlink shared channel message.

In some examples, the payload size of the codebook is equal to the quantity of codewords associated with the first downlink shared channel message.

In some examples, to support transmitting the feedback indication associated with the first feedback, the uplink message component 740 is capable of, configured to, or operable to support a means for puncturing a scheduled uplink shared channel message with transmission of the feedback indication based on an overlap between the scheduled uplink shared channel message and provision of the first feedback.

In some examples, the scheduled uplink shared channel message is punctured by transmission of the feedback indication when a payload size of the codebook satisfies a threshold payload size.

In some examples, to support transmitting the feedback indication associated with the first feedback, the rate matching component 745 is capable of, configured to, or operable to support a means for rate matching a scheduled uplink shared channel message with transmission of the feedback indication based on an overlap between the scheduled uplink shared channel message and provision of the first feedback when a payload size of the codebook satisfies a threshold payload size.

In some examples, the network entity is configured to use the codebook as a fallback codebook when multiple different codebooks are configured and provision of respective feedback for each of the multiple different codebooks are scheduled to overlap.

In some examples, transmission of the feedback indication is in accordance with the codebook and is based on the fallback codebook being prioritized over non-fallback codebooks.

In some examples, transmission of the feedback indication is in accordance with a second codebook different from the codebook. In some examples, the feedback indication includes the first feedback multiplexed with second feedback associated with the second codebook.

Figure 8:
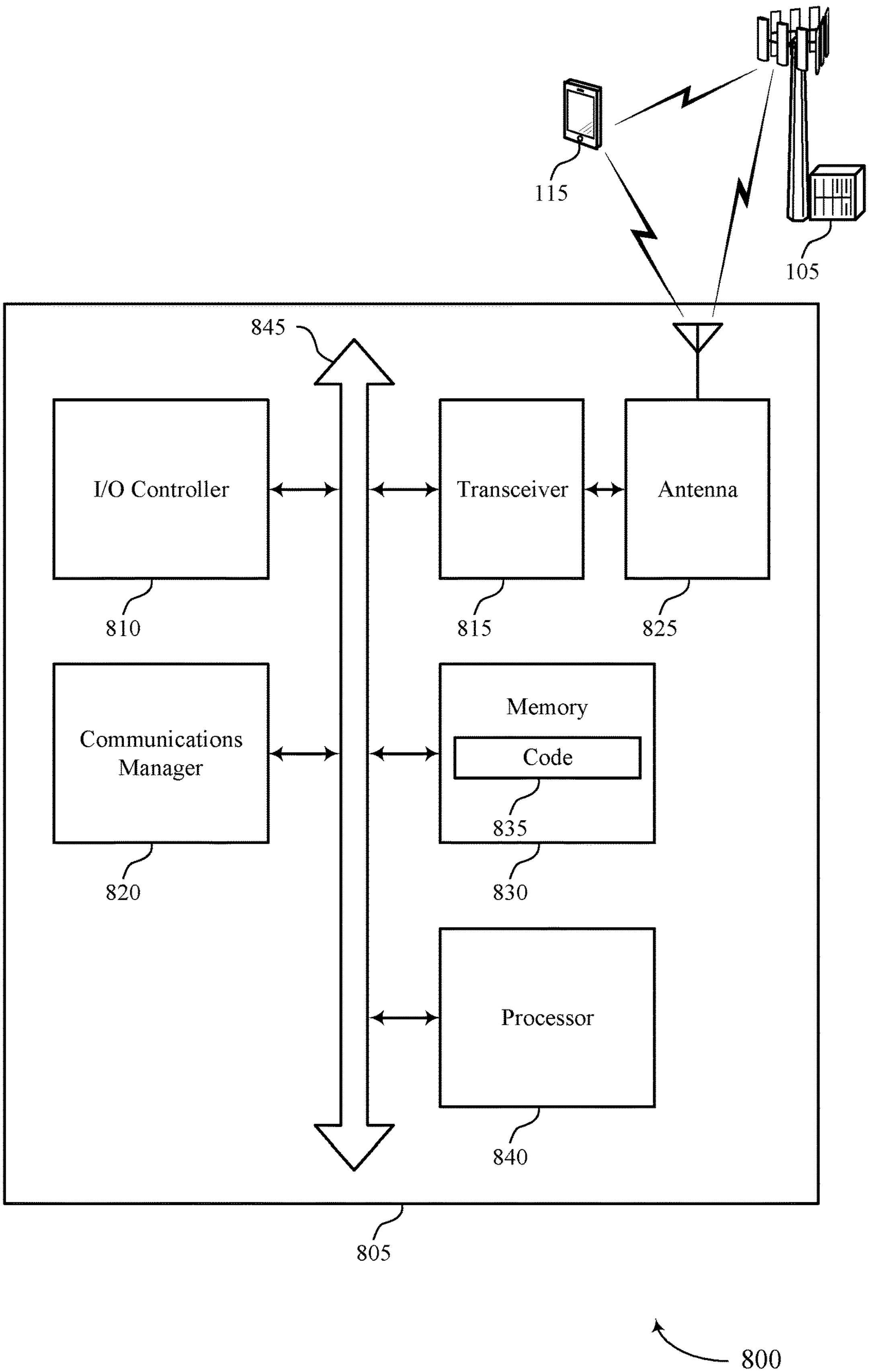
FIG. 8 shows a diagram of a system including a device that supports simplified design for fixed size codebooks in accordance with one or more aspects of the present disclosure.

FIG. 8 shows a diagram of a system 800 including a device 805 that supports simplified design for fixed size codebooks in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting simplified design for fixed size codebooks). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving a first DCI message that schedules a first downlink shared channel message and requests that the network entity provide first feedback with respect to the first downlink shared channel message. The communications manager 820 is capable of, configured to, or operable to support a means for determining a codebook based on reception of the first downlink shared channel message, where the codebook is defined to provide feedback associated with a single DCI message. The communications manager 820 is capable of, configured to, or operable to support a means for transmitting a feedback indication that is associated with the first feedback.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability by supporting a simplified semi-static codebook (e.g., simplified Type-I codebook) design.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of simplified design for fixed size codebooks as described herein, or the at least one processor 840 and the at least one memory 830 may be otherwise configured to, individually or collectively, perform or support such operations.

Figure 9:
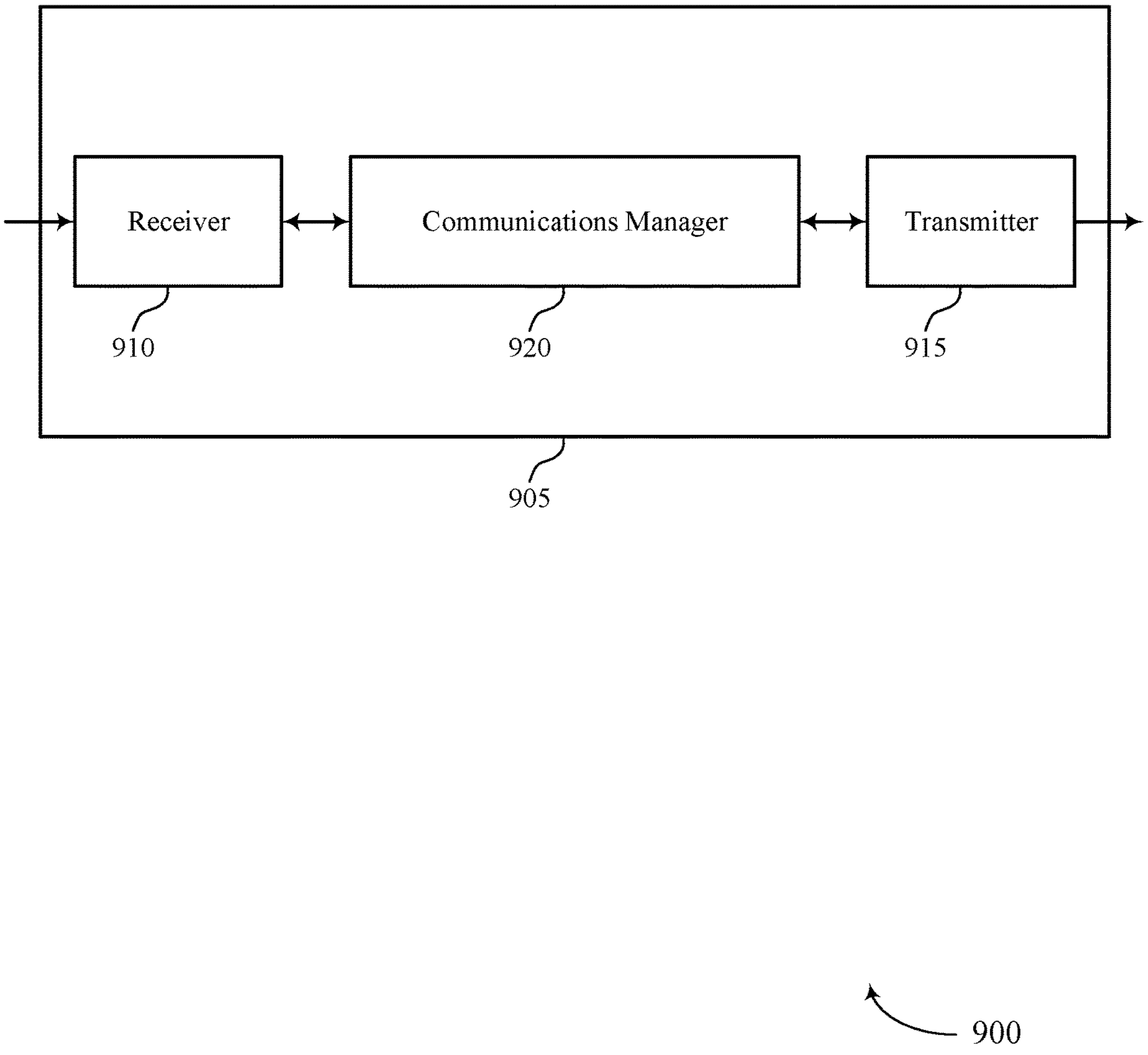
FIGS. 9 and 10 show block diagrams of devices that support simplified design for fixed size codebooks in accordance with one or more aspects of the present disclosure.

FIG. 9 shows a block diagram 900 of a device 905 that supports simplified design for fixed size codebooks in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of simplified design for fixed size codebooks as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for transmitting a first DCI message that schedules a first downlink shared channel message and requests that a second network entity provide first feedback with respect to the first downlink shared channel message. The communications manager 920 is capable of, configured to, or operable to support a means for receiving, via a codebook and based on transmission of the first DCI message, a feedback indication that is associated with the first feedback, where the codebook is defined to provide feedback associated with a single DCI message.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources by supporting a simplified semi-static codebook (e.g., simplified Type-I codebook) design.

Figure 10:
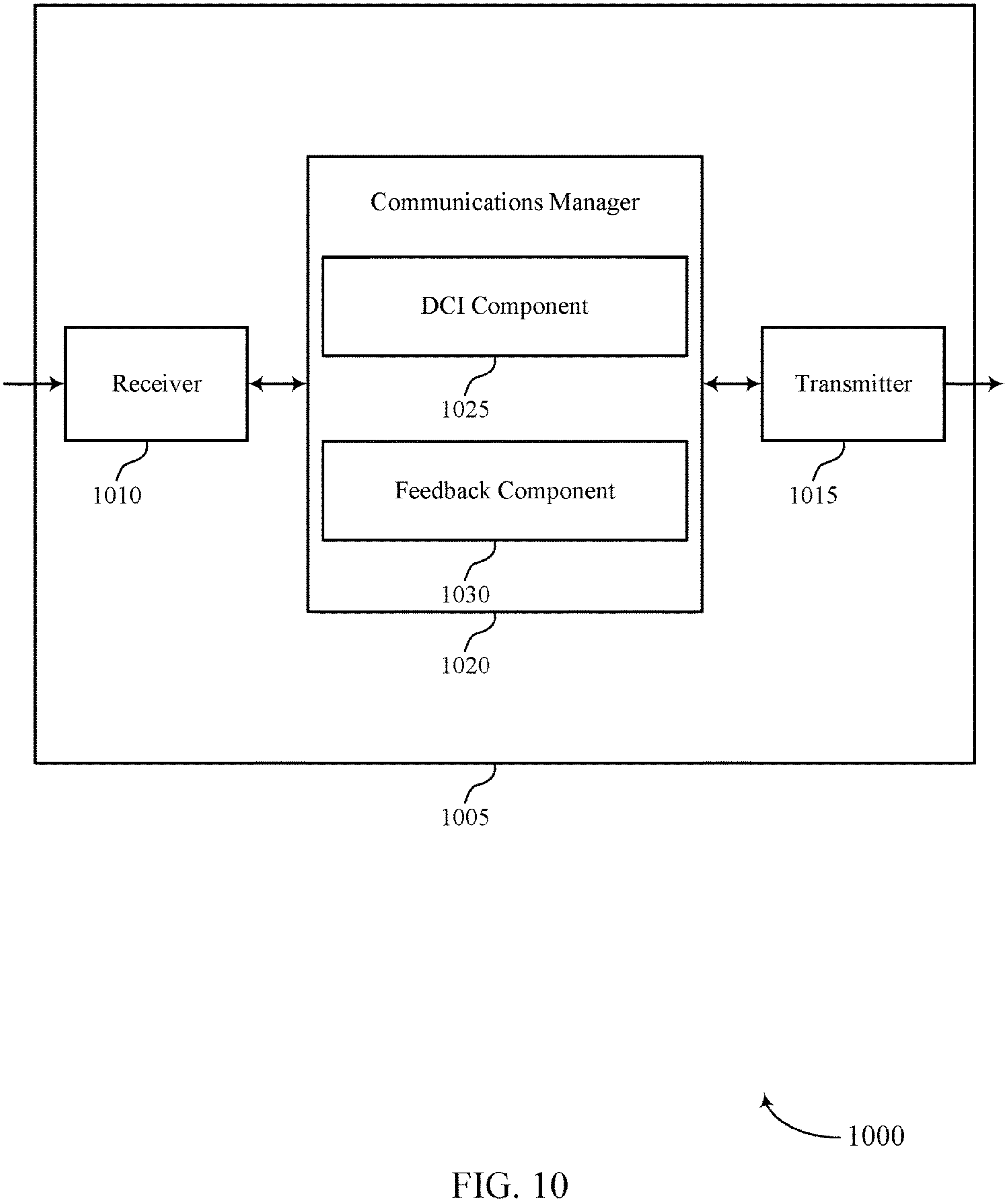

FIG. 10 shows a block diagram 1000 of a device 1005 that supports simplified design for fixed size codebooks in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of simplified design for fixed size codebooks as described herein. For example, the communications manager 1020 may include a DCI component 1025 a feedback component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The DCI component 1025 is capable of, configured to, or operable to support a means for transmitting a first DCI message that schedules a first downlink shared channel message and requests that a second network entity provide first feedback with respect to the first downlink shared channel message. The feedback component 1030 is capable of, configured to, or operable to support a means for receiving, via a codebook and based on transmission of the first DCI message, a feedback indication that is associated with the first feedback, where the codebook is defined to provide feedback associated with a single DCI message.

Figure 11:
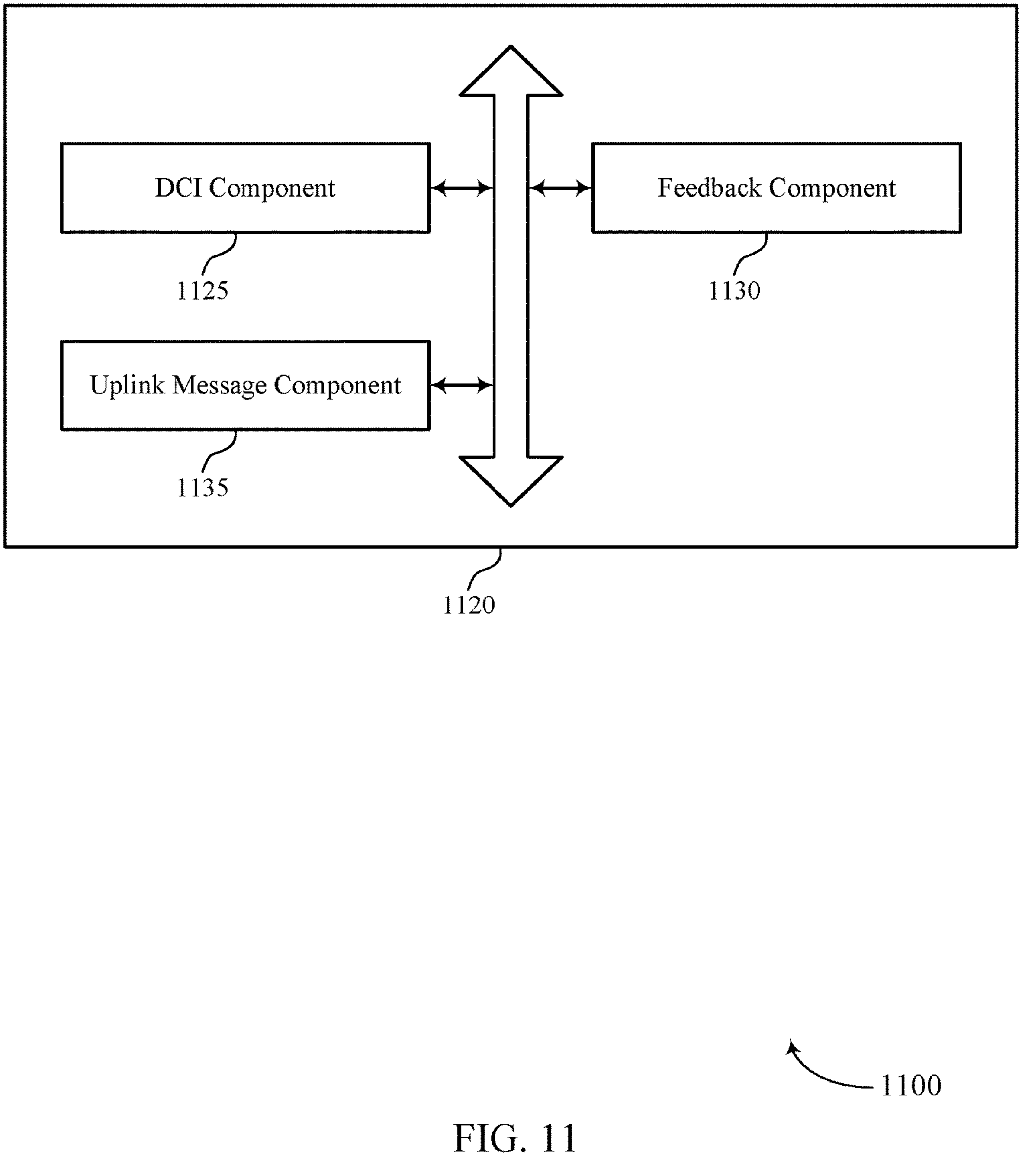
FIG. 11 shows a block diagram of a communications manager that supports simplified design for fixed size codebooks in accordance with one or more aspects of the present disclosure.

FIG. 11 shows a block diagram 1100 of a communications manager 1120 that supports simplified design for fixed size codebooks in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of simplified design for fixed size codebooks as described herein. For example, the communications manager 1120 may include a DCI component 1125, a feedback component 1130, an uplink message component 1135, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The DCI component 1125 is capable of, configured to, or operable to support a means for transmitting a first DCI message that schedules a first downlink shared channel message and requests that a second network entity provide first feedback with respect to the first downlink shared channel message. The feedback component 1130 is capable of, configured to, or operable to support a means for receiving, via a codebook and based on transmission of the first DCI message, a feedback indication that is associated with the first feedback, where the codebook is defined to provide feedback associated with a single DCI message.

In some examples, the DCI component 1125 is capable of, configured to, or operable to support a means for transmitting a second DCI message that schedules a second downlink shared channel message and requests that the second network entity provide second feedback with respect to the second downlink shared channel message, where provision of the second feedback is scheduled by the second DCI message to overlap with provision of the first feedback, where the overlap is associated with an error condition based on the codebook being defined to provide feedback for a single DCI message.

In some examples, the DCI component 1125 is capable of, configured to, or operable to support a means for transmitting a second DCI message that schedules a second downlink shared channel message and requests that the second network entity provide second feedback with respect to the second downlink shared channel message, where provision of the second feedback is scheduled by the second DCI message to overlap with provision of the first feedback; and where receiving the feedback indication via the codebook includes receiving bundled feedback that is associated with the first feedback and with the second feedback, where the bundled feedback is included in the codebook and is associated with an exception based on the overlap. In some examples, the feedback component 1130 is capable of, configured to, or operable to support a means for receiving bundled feedback that is associated with the first feedback and with the second feedback, where the bundled feedback is included in the codebook and is associated with an exception based on the overlap.

In some examples, a payload size of the feedback indication is equal to a quantity of CBGs included in the first downlink shared channel message.

In some examples, a payload size of the feedback indication is equal to a quantity of codewords included in the first downlink shared channel message.

In some examples, the uplink message component 1135 is capable of, configured to, or operable to support a means for receiving a scheduled uplink shared channel message that is punctured with reception of the feedback indication based on an overlap between the scheduled uplink shared channel message and provision of the first feedback.

Figure 12:
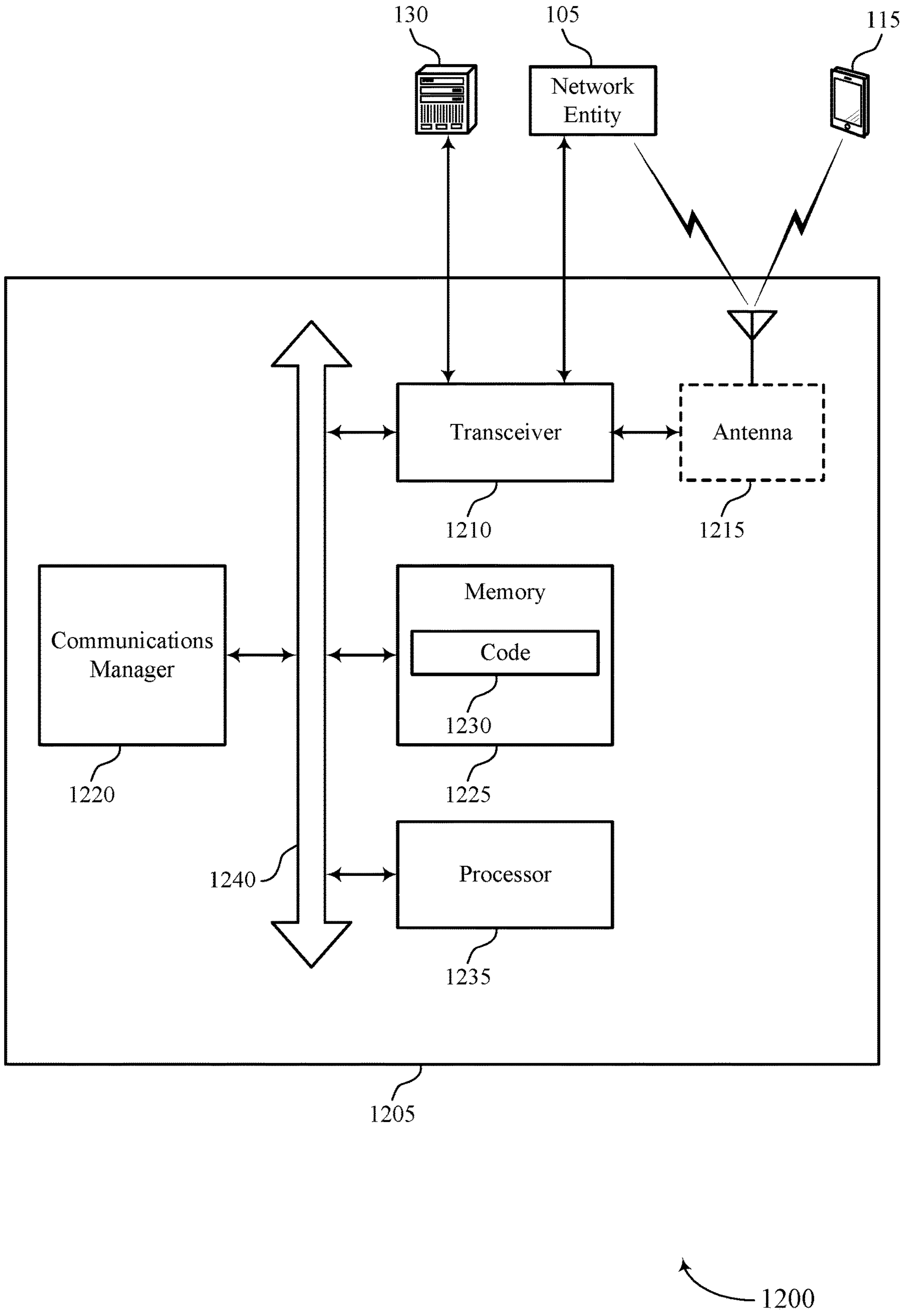
FIG. 12 shows a diagram of a system including a device that supports simplified design for fixed size codebooks in accordance with one or more aspects of the present disclosure.

FIG. 12 shows a diagram of a system 1200 including a device 1205 that supports simplified design for fixed size codebooks in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas

1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting simplified design for fixed size codebooks). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for transmitting a first DCI message that schedules a first downlink shared channel message and requests that a second network entity provide first feedback with respect to the first downlink shared channel message. The communications manager 1220 is capable of, configured to, or operable to support a means for receiving, via a codebook and based on transmission of the first DCI message, a feedback indication that is associated with the first feedback, where the codebook is defined to provide feedback associated with a single DCI message.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability by supporting a simplified semi-static codebook (e.g., simplified Type-I codebook) design.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of simplified design for fixed size codebooks as described herein, or the at least one processor 1235 and the at least one memory 1225 may be otherwise configured to, individually or collectively, perform or support such operations.

Figure 13:
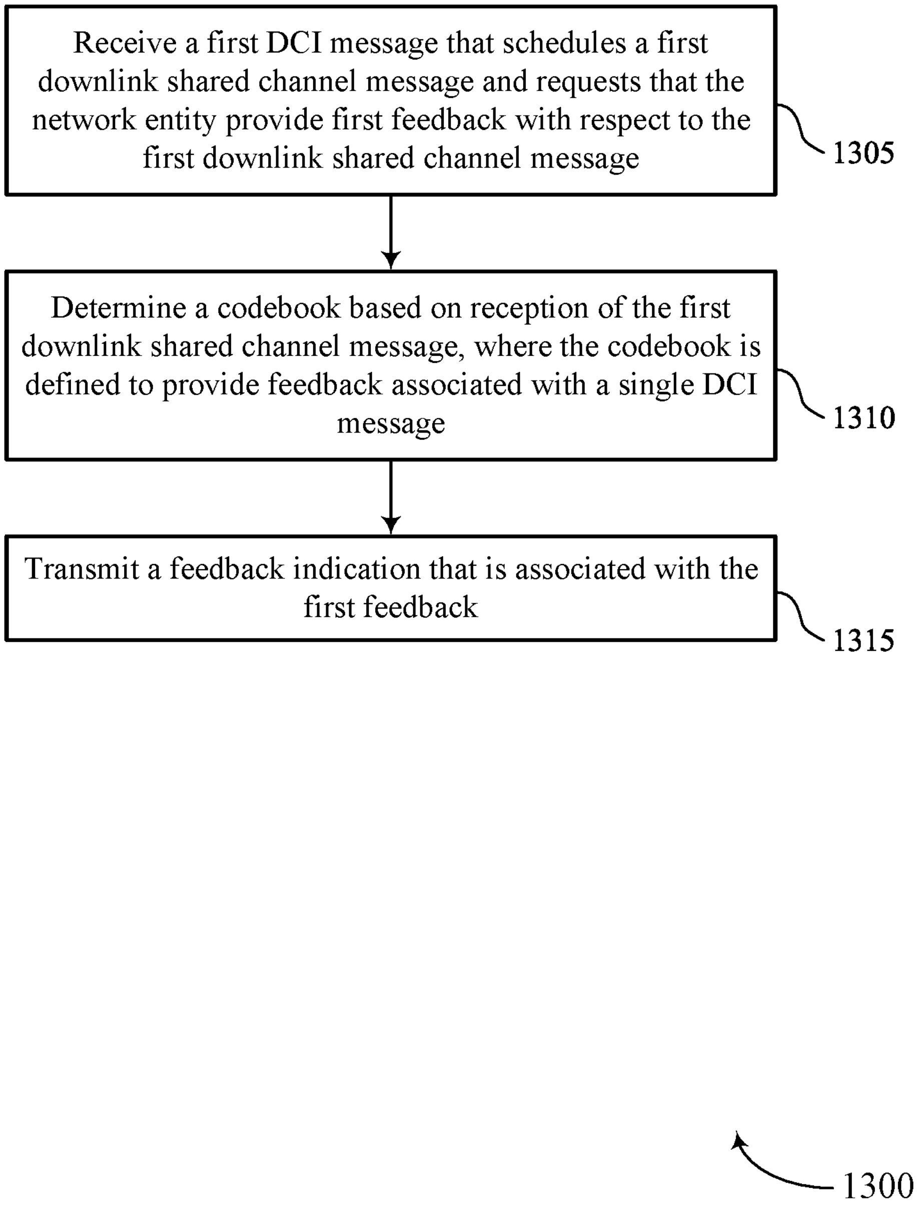
FIGS. 13 through 16 show flowcharts illustrating methods that support simplified design for fixed size codebooks in accordance with one or more aspects of the present disclosure.

FIG. 13 shows a flowchart illustrating a method 1300 that supports simplified design for fixed size codebooks in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first DCI message that schedules a first downlink shared channel message and requests that the network entity provide first feedback with respect to the first downlink shared channel message. The operations of 1305 may be performed in accordance with examples as disclosed herein. In some examples, aspects of the operations of 1305 may be performed by a DCI component 725 as described with reference to FIG. 7.

At 1310, the method may include determining a codebook based on reception of the first downlink shared channel message, where the codebook is defined to provide feedback associated with a single DCI message. The operations of 1310 may be performed in accordance with examples as disclosed herein. In some examples, aspects of the operations of 1310 may be performed by a codebook component 730 as described with reference to FIG. 7.

At 1315, the method may include transmitting a feedback indication that is associated with the first feedback. The operations of 1315 may be performed in accordance with examples as disclosed herein. In some examples, aspects of the operations of 1315 may be performed by a feedback component 735 as described with reference to FIG. 7.

Figure 14:
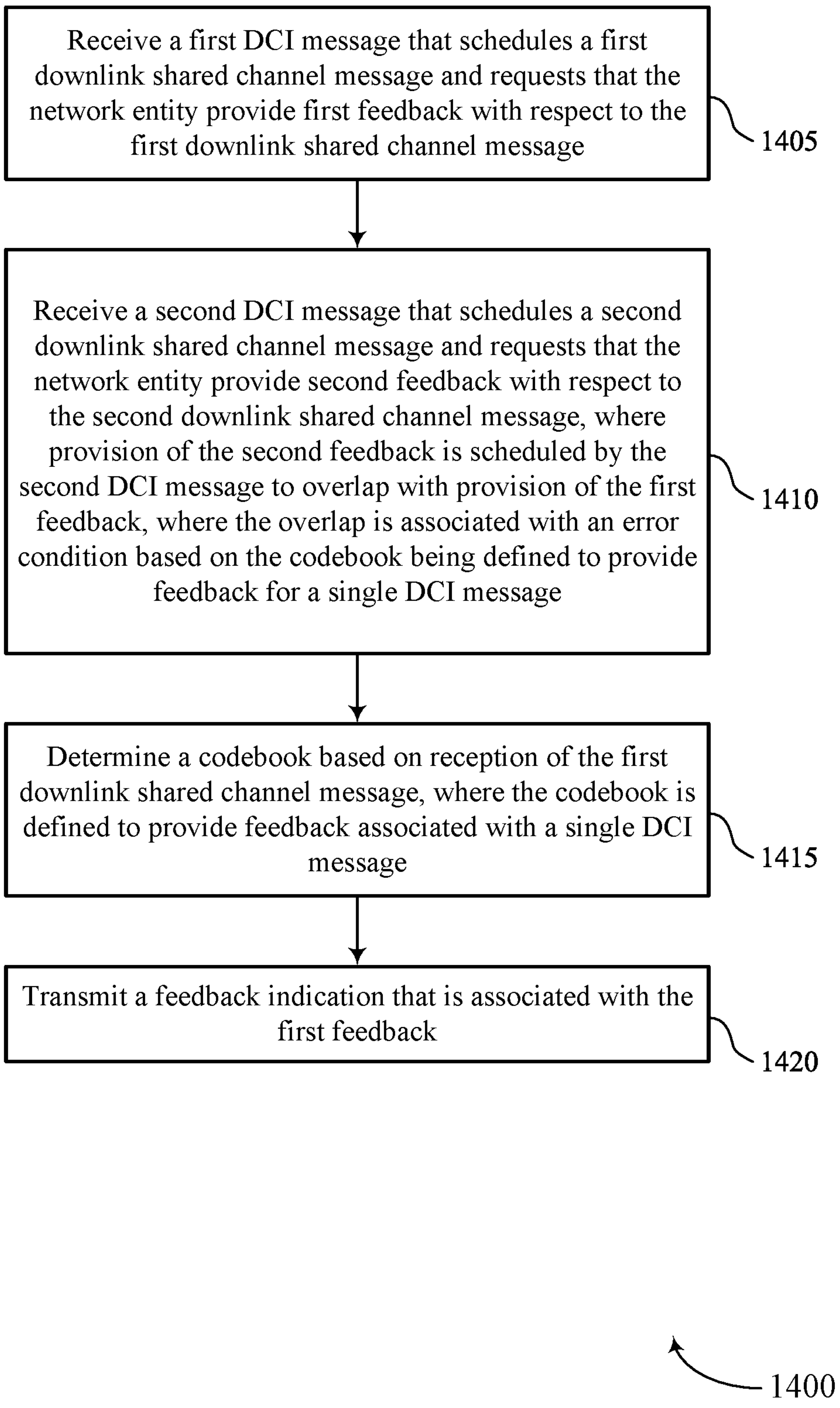

FIG. 14 shows a flowchart illustrating a method 1400 that supports simplified design for fixed size codebooks in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first DCI message that schedules a first downlink shared channel message and requests that the network entity provide first feedback with respect to the first downlink shared channel message. The operations of 1405 may be performed in accordance with examples as disclosed herein. In some examples, aspects of the operations of 1405 may be performed by a DCI component 725 as described with reference to FIG. 7.

At 1410, the method may include receiving a second DCI message that schedules a second downlink shared channel message and requests that the network entity provide second feedback with respect to the second downlink shared channel message, where provision of the second feedback is scheduled by the second DCI message to overlap with provision of the first feedback, where the overlap is associated with an error condition based on the codebook being defined to provide feedback for a single DCI message. The operations of 1410 may be performed in accordance with examples as disclosed herein. In some examples, aspects of the operations of 1410 may be performed by a DCI component 725 as described with reference to FIG. 7.

At 1415, the method may include determining a codebook based on reception of the first downlink shared channel message, where the codebook is defined to provide feedback associated with a single DCI message, and where determining the codebook may include populating the codebook with the first feedback. The operations of 1415 may be performed in accordance with examples as disclosed herein. In some examples, aspects of the operations of 1415 may be performed by a codebook component 730 as described with reference to FIG. 7.

At 1420, the method may include transmitting a feedback indication that is associated with the first feedback. The operations of 1420 may be performed in accordance with examples as disclosed herein. In some examples, aspects of the operations of 1420 may be performed by a feedback component 735 as described with reference to FIG. 7.

Figure 15:
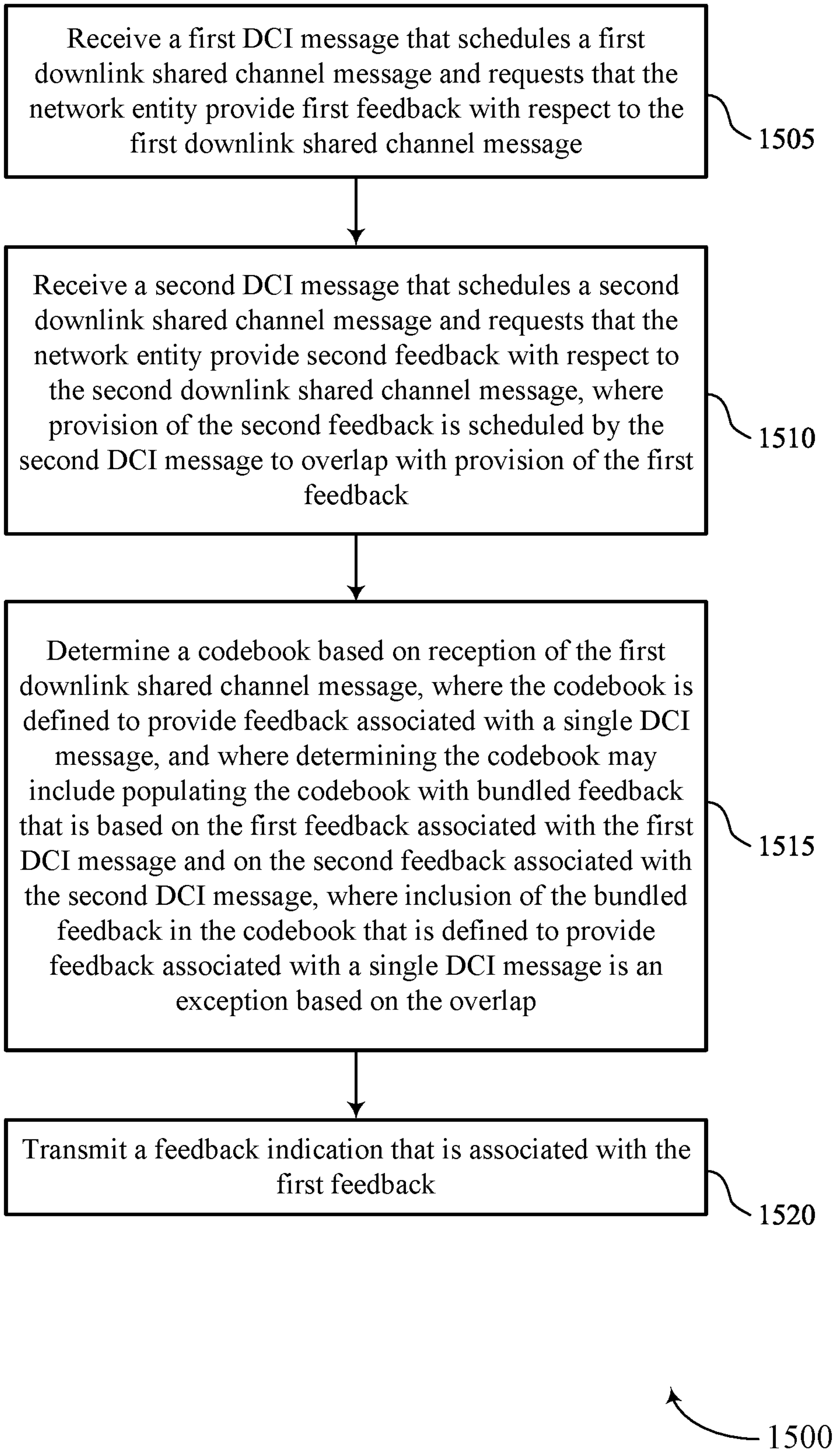

FIG. 15 shows a flowchart illustrating a method 1500 that supports simplified design for fixed size codebooks in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first DCI message that schedules a first downlink shared channel message and requests that the network entity provide first feedback with respect to the first downlink shared channel message. The operations of 1505 may be performed in accordance with examples as disclosed herein. In some examples, aspects of the operations of 1505 may be performed by a DCI component 725 as described with reference to FIG. 7.

At 1510, the method may include receiving a second DCI message that schedules a second downlink shared channel message and requests that the network entity provide second feedback with respect to the second downlink shared channel message, where provision of the second feedback is scheduled by the second DCI message to overlap with provision of the first feedback. The operations of 1510 may be performed in accordance with examples as disclosed herein. In some examples, aspects of the operations of 1510 may be performed by a DCI component 725 as described with reference to FIG. 7.

At 1515, the method may include determining a codebook based on reception of the first downlink shared channel message, where the codebook is defined to provide feedback associated with a single DCI message, and where determining the codebook may include populating the codebook with bundled feedback that is based on the first feedback associated with the first DCI message and on the second feedback associated with the second DCI message, where inclusion of the bundled feedback in the codebook that is defined to provide feedback associated with a single DCI message is an exception based on the overlap. The operations of 1515 may be performed in accordance with examples as disclosed herein. In some examples, aspects of the operations of 1515 may be performed by a codebook component 730 as described with reference to FIG. 7.

At 1520, the method may include transmitting a feedback indication that is associated with the first feedback. The operations of 1520 may be performed in accordance with examples as disclosed herein. In some examples, aspects of the operations of 1520 may be performed by a feedback component 735 as described with reference to FIG. 7.

Figure 16:
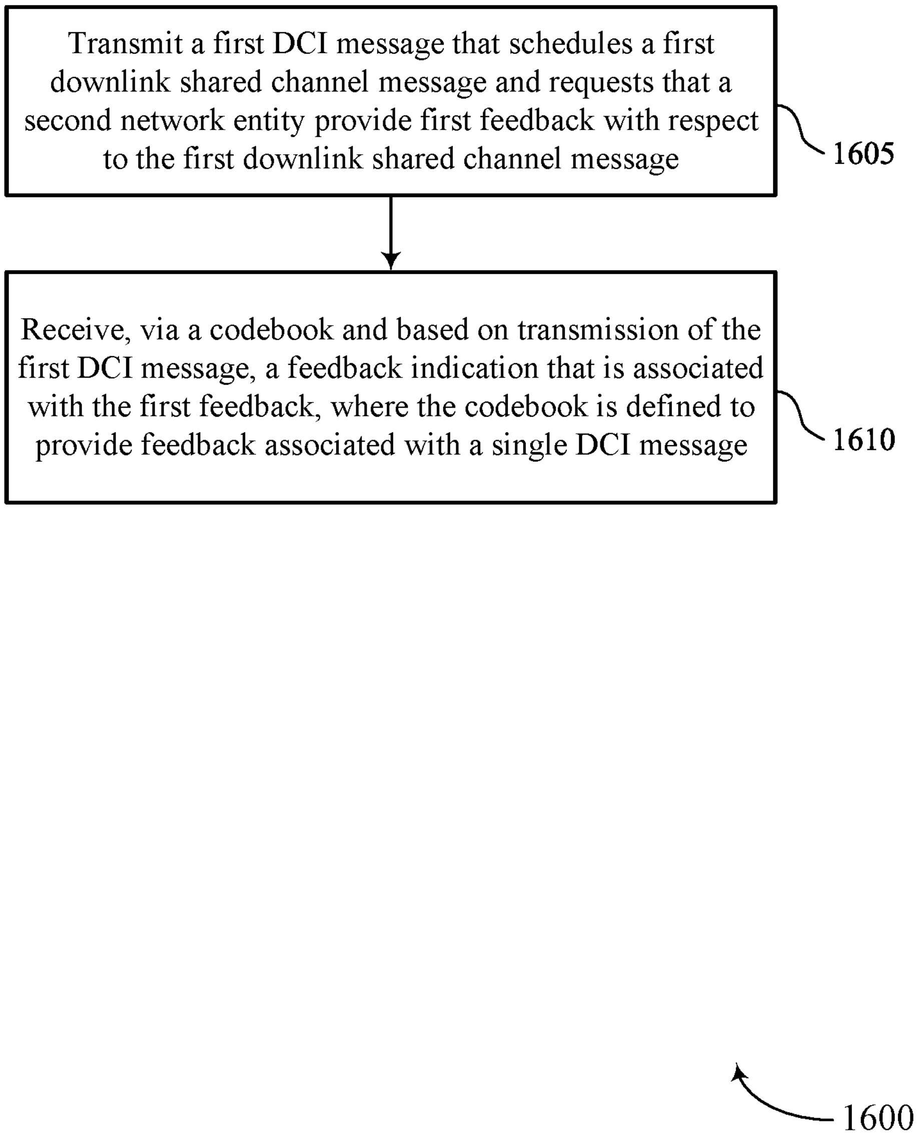

FIG. 16 shows a flowchart illustrating a method 1600 that supports simplified design for fixed size codebooks in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a first DCI message that schedules a first downlink shared channel message and requests that a second network entity provide first feedback with respect to the first downlink shared channel message. The operations of 1605 may be performed in accordance with examples as disclosed herein. In some examples, aspects of the operations of 1605 may be performed by a DCI component 1125 as described with reference to FIG. 11.

At 1610, the method may include receiving, via a codebook and based on transmission of the first DCI message, a feedback indication that is associated with the first feedback, where the codebook is defined to provide feedback associated with a single DCI message. The operations of 1610 may be performed in accordance with examples as disclosed herein. In some examples, aspects of the operations of 1610 may be performed by a feedback component 1130 as described with reference to FIG. 11.

The following provides an overview of aspects of the present disclosure:

Aspect 1: A method for wireless communication by a network entity, comprising: receiving a first DCI message that schedules a first downlink shared channel message and requests that the network entity provide first feedback with respect to the first downlink shared channel message; determining a codebook based on reception of the first downlink shared channel message, wherein the codebook is defined to provide feedback associated with a single DCI message; and transmitting a feedback indication that is associated with the first feedback.

Aspect 2: The method of aspect 1, further comprising: receiving a second DCI message that schedules a second downlink shared channel message and requests that the network entity provide second feedback with respect to the second downlink shared channel message, wherein provision of the second feedback is scheduled by the second DCI message to overlap with provision of the first feedback, wherein the overlap is associated with an error condition based on the codebook being defined to provide feedback for a single DCI message; and wherein determining the codebook comprises: populating the codebook with the first feedback.

Aspect 3: The method of aspect 1, further comprising: receiving a second DCI message that schedules a second downlink shared channel message and requests that the network entity provide second feedback with respect to the second downlink shared channel message, wherein provision of the second feedback is scheduled by the second DCI message to overlap with provision of the first feedback; and wherein determining the codebook comprises: populating the codebook with bundled feedback that is based on the first feedback associated with the first DCI message and on the second feedback associated with the second DCI message, wherein inclusion of the bundled feedback in the codebook that is defined to provide feedback associated with a single DCI message is an exception based on the overlap.

Aspect 4: The method of any of aspects 1 through 3, wherein determining the codebook comprises: including the first feedback in the codebook on a per-code block group (CBG) basis when CBG feedback is enabled, wherein a payload size of the codebook is based on a quantity of CBGs associated with the first downlink shared channel message.

Aspect 5: The method of aspect 4, wherein the payload size of the codebook is equal to the quantity of CBGs associated with the first downlink shared channel message.

Aspect 6: The method of any of aspects 1 through 5, wherein determining the codebook comprises: including the first feedback in the codebook on a per-codeword basis, wherein a payload size of the codebook is based on a quantity of codewords associated with the first downlink shared channel message.

Aspect 7: The method of aspect 6, wherein the payload size of the codebook is equal to the quantity of codewords associated with the first downlink shared channel message.

Aspect 8: The method of any of aspects 1 through 7, wherein transmitting the feedback indication associated with the first feedback comprises: puncturing a scheduled uplink shared channel message with transmission of the feedback indication based on an overlap between the scheduled uplink shared channel message and provision of the first feedback.

Aspect 9: The method of aspect 8, wherein the scheduled uplink shared channel message is punctured by transmission of the feedback indication when a payload size of the codebook satisfies a threshold payload size.

Aspect 10: The method of any of aspects 1 through 7, wherein transmitting the feedback indication associated with the first feedback comprises: rate matching a scheduled uplink shared channel message with transmission of the feedback indication based on an overlap between the scheduled uplink shared channel message and provision of the first feedback when a payload size of the codebook satisfies a threshold payload size.

Aspect 11: The method of any of aspects 1 through 10, wherein the network entity is configured to use the codebook as a fallback codebook when multiple different codebooks are configured and provision of respective feedback for each of the multiple different codebooks are scheduled to overlap.

Aspect 12: The method of aspect 11, wherein transmission of the feedback indication is in accordance with the codebook and is based on the fallback codebook being prioritized over non-fallback codebooks.

Aspect 13: The method of any of aspects 11 through 12, wherein transmission of the feedback indication is in accordance with a second codebook different from the codebook, and the feedback indication comprises the first feedback multiplexed with second feedback associated with the second codebook.

Aspect 14: A method for wireless communication by a first network entity, comprising: transmitting a first DCI message that schedules a first downlink shared channel message and requests that a second network entity provide first feedback with respect to the first downlink shared channel message; and receiving, via a codebook and based on transmission of the first DCI message, a feedback indication that is associated with the first feedback, wherein the codebook is defined to provide feedback associated with a single DCI message.

Aspect 15: The method of aspect 14, further comprising: transmitting a second DCI message that schedules a second downlink shared channel message and requests that the second network entity provide second feedback with respect to the second downlink shared channel message, wherein provision of the second feedback is scheduled by the second DCI message to overlap with provision of the first feedback, wherein the overlap is associated with an error condition based on the codebook being defined to provide feedback for a single DCI message.

Aspect 16: The method of aspect 14, further comprising: transmitting a second DCI message that schedules a second downlink shared channel message and requests that the second network entity provide second feedback with respect to the second downlink shared channel message, wherein provision of the second feedback is scheduled by the second DCI message to overlap with provision of the first feedback; and wherein receiving the feedback indication via the codebook comprises: receiving bundled feedback that is associated with the first feedback and with the second feedback, wherein the bundled feedback is included in the codebook and is associated with an exception based on the overlap.

Aspect 17: The method of any of aspects 14 through 16, wherein a payload size of the feedback indication is equal to a quantity of CBGs included in the first downlink shared channel message.

Aspect 18: The method of any of aspects 14 through 17, wherein a payload size of the feedback indication is equal to a quantity of codewords included in the first downlink shared channel message.

Aspect 19: The method of any of aspects 14 through 18, further comprising: receiving a scheduled uplink shared channel message that is punctured with reception of the feedback indication based on an overlap between the scheduled uplink shared channel message and provision of the first feedback.

Aspect 20: A network entity for wireless communication, comprising one or more memories storing processor-executable code, and one or more processors coupled with the one or more memories and individually or collectively operable to execute the code to cause the network entity to perform a method of any of aspects 1 through 13.

Aspect 21: A network entity for wireless communication, comprising at least one means for performing a method of any of aspects 1 through 13.

Aspect 22: A non-transitory computer-readable medium storing code for wireless communication, the code comprising instructions executable by one or more processors to perform a method of any of aspects 1 through 13.

Aspect 23: A first network entity for wireless communication, comprising one or more memories storing processor-executable code, and one or more processors coupled with the one or more memories and individually or collectively operable to execute the code to cause the first network entity to perform a method of any of aspects 14 through 19.

Aspect 24: A first network entity for wireless communication, comprising at least one means for performing a method of any of aspects 14 through 19.

Aspect 25: A non-transitory computer-readable medium storing code for wireless communication, the code comprising instructions executable by one or more processors to perform a method of any of aspects 14 through 19.

The methods described herein describe possible implementations, and the operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communication, comprising:

a processing system configured to:

receive a first downlink control information (DCI) message that schedules a first downlink shared channel message and requests that the network entity provide first feedback with respect to the first downlink shared channel message;

determine a codebook based on reception of the first downlink shared channel message, wherein the codebook is defined to provide feedback associated with a single DCI message;

receive a second DCI message that schedules a second downlink shared channel message and requests that the network entity provide second feedback with respect to the second downlink shared channel message, wherein provision of the second feedback is scheduled by the second DCI message to overlap with provision of the first feedback, wherein the overlap is associated with an error condition based on the codebook being defined to provide feedback for a single DCI message; and transmit a feedback indication that is associated with the first feedback.

2. The network entity of claim 1, wherein, to determine the codebook, the processing system is configured to:

populate the codebook with the first feedback.

3. The network entity of claim 1, wherein, to determine the codebook, the processing system is configured to:

include the first feedback in the codebook on a per-code block group (CBG) basis when CBG feedback is enabled, wherein a payload size of the codebook is based on a quantity of CBGs associated with the first downlink shared channel message.

4. The network entity of claim 3, wherein the payload size of the codebook is equal to the quantity of CBGs associated with the first downlink shared channel message.

5. The network entity of claim 1, wherein, to determine the codebook, the processing system is configured to:

include the first feedback in the codebook on a per-codeword basis, wherein a payload size of the codebook is based on a quantity of codewords associated with the first downlink shared channel message.

6. The network entity of claim 5, wherein the payload size of the codebook is equal to the quantity of codewords associated with the first downlink shared channel message.

7. The network entity of claim 1, wherein, to transmit the feedback indication associated with the first feedback, the processing system is configured to:

puncture a scheduled uplink shared channel message with transmission of the feedback indication based on an overlap between the scheduled uplink shared channel message and provision of the first feedback.

8. The network entity of claim 7, wherein the scheduled uplink shared channel message is punctured by transmission of the feedback indication when a payload size of the codebook satisfies a threshold payload size.

9. A network entity for wireless communication, comprising:

a processing system configured to:

receive a first downlink control information (DCI) message that schedules a first downlink shared channel message and requests that the network entity provide first feedback with respect to the first downlink shared channel message;

determine a codebook based on reception of the first downlink shared channel message, wherein the codebook is defined to provide feedback associated with a single DCI message; and receive a second DCI message that schedules a second downlink shared channel message and requests that the network entity provide second feedback with respect to the second downlink shared channel message, wherein provision of the second feedback is scheduled by the second DCI message to overlap with provision of the first feedback; and wherein, to determine the codebook, the processing system is configured to:

populate the codebook with bundled feedback that is based on the first feedback associated with the first DCI message and on the second feedback associated with the second DCI message, wherein inclusion of the bundled feedback in the codebook that is defined to provide feedback associated with a single DCI message is an exception based on the overlap, wherein the processing system is configured to transmit a feedback indication that is associated with the first feedback.

10. The network entity of claim 9, wherein, to determine the codebook, the processing system is configured to:

include the first feedback in the codebook on a per-code block group (CBG) basis when CBG feedback is enabled, wherein a payload size of the codebook is based on a quantity of CBGs associated with the first downlink shared channel message.

11. The network entity of claim 10, wherein the payload size of the codebook is equal to the quantity of CBGs associated with the first downlink shared channel message.

12. The network entity of claim 9, wherein, to determine the codebook, the processing system is configured to:

include the first feedback in the codebook on a per-codeword basis, wherein a payload size of the codebook is based on a quantity of codewords associated with the first downlink shared channel message.

13. The network entity of claim 12, wherein the payload size of the codebook is equal to the quantity of codewords associated with the first downlink shared channel message.

14. A network entity for wireless communication, comprising:

a processing system configured to:

receive a first downlink control information (DCI) message that schedules a first downlink shared channel message and requests that the network entity provide first feedback with respect to the first downlink shared channel message;

determine a codebook based on reception of the first downlink shared channel message, wherein the codebook is defined to provide feedback associated with a single DCI message; and transmit a feedback indication that is associated with the first feedback, wherein, to transmit the feedback indication associated with the first feedback, the processing system is configured to:

rate match a scheduled uplink shared channel message with transmission of the feedback indication based on an overlap between the scheduled uplink shared channel message and provision of the first feedback when a payload size of the codebook satisfies a threshold payload size.

15. The network entity of claim 14, wherein, to determine the codebook, the processing system is configured to:

include the first feedback in the codebook on a per-code block group (CBG) basis when CBG feedback is enabled, wherein the payload size of the codebook is based on a quantity of CBGs associated with the first downlink shared channel message.

16. The network entity of claim 15, wherein the payload size of the codebook is equal to the quantity of CBGs associated with the first downlink shared channel message.

17. The network entity of claim 14, wherein, to determine the codebook, the processing system is configured to:

include the first feedback in the codebook on a per-codeword basis, wherein the payload size of the codebook is based on a quantity of codewords associated with the first downlink shared channel message.

18. The network entity of claim 17, wherein the payload size of the codebook is equal to the quantity of codewords associated with the first downlink shared channel message.

19. A network entity for wireless communication, comprising:

a processing system configured to:

receive a first downlink control information (DCI) message that schedules a first downlink shared channel message and requests that the network entity provide first feedback with respect to the first downlink shared channel message;

determine a codebook based on reception of the first downlink shared channel message, wherein the codebook is defined to provide feedback associated with a single DCI message;

use the codebook as a fallback codebook when multiple different codebooks are configured and provision of respective feedback for each of the multiple different codebooks are scheduled to overlap; and transmit, in accordance with the codebook and based on the fallback codebook being prioritized over non-fallback codebooks, a feedback indication that is associated with the first feedback.

20. The network entity of claim 19, wherein, to determine the codebook, the processing system is configured to:

include the first feedback in the codebook on a per-code block group (CBG) basis when CBG feedback is enabled, wherein a payload size of the codebook is based on a quantity of CBGs associated with the first downlink shared channel message.

21. The network entity of claim 20, wherein the payload size of the codebook is equal to the quantity of CBGs associated with the first downlink shared channel message.

22. The network entity of claim 19, wherein, to determine the codebook, the processing system is configured to:

include the first feedback in the codebook on a per-codeword basis, wherein a payload size of the codebook is based on a quantity of codewords associated with the first downlink shared channel message.

23. The network entity of claim 22, wherein the payload size of the codebook is equal to the quantity of codewords associated with the first downlink shared channel message.

24. A first network entity for wireless communication, comprising:

a processing system configured to:

transmit a first downlink control information (DCI) message that schedules a first downlink shared channel message and requests that a second network entity provide first feedback with respect to the first downlink shared channel message;

receive, via a codebook and based on transmission of the first DCI message, a feedback indication that is associated with the first feedback, wherein the codebook is defined to provide feedback associated with a single DCI message; and transmit a second DCI message that schedules a second downlink shared channel message and requests that the second network entity provide second feedback with respect to the second downlink shared channel message, wherein provision of the second feedback is scheduled by the second DCI message to overlap with provision of the first feedback, wherein the overlap is associated with an error condition based on the codebook being defined to provide feedback for a single DCI message.

25. The first network entity of claim 24, wherein a payload size of the feedback indication is equal to a quantity of code block groups (CBGs) included in the first downlink shared channel message.

26. The first network entity of claim 24, wherein a payload size of the feedback indication is equal to a quantity of codewords included in the first downlink shared channel message.

27. The first network entity of claim 24, wherein the processing system is configured to:

receive a scheduled uplink shared channel message that is punctured with reception of the feedback indication based on an overlap between the scheduled uplink shared channel message and provision of the first feedback.

28. A first network entity for wireless communication, comprising:

a processing system configured to:

transmit a first downlink control information (DCI) message that schedules a first downlink shared channel message and requests that a second network entity provide first feedback with respect to the first downlink shared channel message;

receive, via a codebook and based on transmission of the first DCI message, a feedback indication that is associated with the first feedback, wherein the codebook is defined to provide feedback associated with a single DCI message; and transmit a second DCI message that schedules a second downlink shared channel message and requests that the second network entity provide second feedback with respect to the second downlink shared channel message, wherein provision of the second feedback is scheduled by the second DCI message to overlap with provision of the first feedback; and wherein, to receive the feedback indication via the codebook, the processing system is configured to:

receive bundled feedback that is associated with the first feedback and with the second feedback, wherein the bundled feedback is included in the codebook and is associated with an exception based on the overlap.

* * * * *